US012745062B2

(12) United States Patent
Shah et al.

(10) Patent No.: US 12,745,062 B2
(45) Date of Patent: Sep. 22, 2026

(54) TECHNIQUES FOR USING A SUBSTITUTE OUTPUT TRAJECTORY

(71) Applicant: Apple Inc., Cupertino, CA (US)

(72) Inventors: Ronak J. Shah, Sunnyvale, CA (US); Jeffrey D. Whitman, Campbell, CA (US); Glen A. Rhodes, Campbell, CA (US); Sijin Kim, San Jose, CA (US); Arto Kivila, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 213 days.

(21) Appl. No.: 18/617,920

(22) Filed: Mar. 27, 2024

(65) Prior Publication Data

US 2025/0113164 A1 Apr. 3, 2025

Related U.S. Application Data

(60) Provisional application No. 63/541,766, filed on Sep. 29, 2023.

(51) Int. Cl.
*H04W 4/029* (2018.01)

(52) U.S. Cl.
CPC .................................. *H04W 4/029* (2018.02)

(58) Field of Classification Search
CPC .................................................... H04W 4/029
See application file for complete search history.

(56) References Cited

U.S. PATENT DOCUMENTS 6,323,846 B1 11/2001 Westerman et al.
6,570,557 B1 5/2003 Westerman et al.
6,677,932 B1 1/2004 Westerman
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,844,914 B2 11/2010 Andre et al.
7,957,762 B2 6/2011 Herz et al.
8,006,002 B2 8/2011 Kalayjian et al.
8,239,784 B2 8/2012 Hotelling et al.
8,279,180 B2 10/2012 Hotelling et al.
8,381,135 B2 2/2013 Hotelling et al.
8,479,122 B2 7/2013 Hotelling et al.
9,348,458 B2 5/2016 Hotelling et al.
9,933,937 B2 4/2018 Lemay et al.
10,303,257 B2 5/2019 Hillis et al.
11,275,405 B2 3/2022 Hotelling
2002/0015024 A1 2/2002 Westerman et al.
(Continued)

FOREIGN PATENT DOCUMENTS

CN 116954534 A 10/2023
DE 102015212652 A1 1/2017
(Continued)

OTHER PUBLICATIONS

International Patent Application No. PCT/US2024/049121; Invitation to Pay Add'l Fees; dated Dec. 18, 2024; 17 pages.
(Continued)

*Primary Examiner* — Nader Bolourchi
(74) *Attorney, Agent, or Firm* — Kyle B. Morse; Anthony R. McCain, Jr.; BAKERHOSTETLER LLC

(57) ABSTRACT

The present disclosure generally relates to controlling output components.

48 Claims, 13 Drawing Sheets

(56) References Cited

U.S. PATENT DOCUMENTS

2005/0190059 A1 9/2005 Wehrenberg
2006/0017692 A1 1/2006 Wehrenberg et al.
2006/0033724 A1 2/2006 Chaudhri et al.
2012/0143496 A1 6/2012 Chitre et al.
2014/0309924 A1 10/2014 Varoglu et al.
2015/0135109 A1* 5/2015 Zambetti ............. G06F 3/03547 715/767
2015/0138155 A1* 5/2015 Bernstein .............. G06F 3/0488 345/174
2016/0007158 A1 1/2016 Venkatraman et al.
2016/0132030 A1* 5/2016 Marti .................... H04L 12/282 700/275
2016/0231718 A1 8/2016 Logan et al.
2017/0164293 A1 6/2017 Hwang
2018/0088887 A1 3/2018 LeBlanc et al.
2018/0374002 A1 12/2018 Li
2019/0180485 A1 6/2019 Kim et al.
2021/0284159 A1 9/2021 Koike et al.
2021/0380137 A1 12/2021 Domeyer et al.
2022/0066405 A1 3/2022 Harvey
2022/0084374 A1 3/2022 Dour et al.
2022/0238083 A1 7/2022 Sasayama et al.
2023/0118074 A1 4/2023 Park et al.
2023/0174062 A1 6/2023 Eswaran

FOREIGN PATENT DOCUMENTS

WO WO 2013/169849 A2 11/2013
WO WO 2014/105276 A1 7/2014

OTHER PUBLICATIONS

International Patent Application No. PCT/US2024/040128; Invitation to Pay Add'l Fees; dated Dec. 19, 2024; 10 pages.
International Patent Application No. PCT/US2024/049096; Invitation to Pay Add's Fees; dated Jan. 20, 2025; 16 pages.
U.S. Appl. No. 60/936,562, filed Jun. 20, 2007, Lemay et al.
International Patent Application No. PCT/US2024/040128; Int'l Search Report and the Written Opinion; dated Feb. 10, 2025; 17 pages.
International Patent Application No. PCT/US2024/049121; Int'l Search Report and the Written Opinion; dated Feb. 13, 2025; 24 pages.
International Patent Application No. PCT/US2023/033559; Int'l Search Report and the Written Opinion; dated Feb. 12, 2024; 22 pages.
International Patent Application No. PCT/US2024/049096; Int'l Search Report and the Written Opinion; dated Mar. 13, 2025; 23 pages.
Meschtscherjakov et al.; "Bubble Margin: Motion Sickness Prevention While Reading on Smartphones in Vehicles"; Human—Computer Interaction—2019; 18 pages.
International Patent Application No. PCT/US2025/011891; Invitation to Pay Add'l Fees; dated Apr. 22, 2025; 14 pages.
International Patent Application No. PCT/US2025/014962; Invitation to Pay Add'l Fees; dated May 28, 2025; 11 pages.
International Patent Application No. PCT/US2023/033558; Invitation to Pay Add'l Fees; dated Jan. 19, 2024; 11 pages.
International Patent Application No. PCT/US2023/033558; Int'l Search Report and the Written Opinion; dated Mar. 13, 2024; 18 pages.
International Patent Application No. PCT/US2025/011891; Int'l Search Report and the Written Opinion; dated Jun. 13, 2025; 21 pages.
International Patent Application No. PCT/US2025/014962; Int'l Search Report and the Written Opinion; dated Jul. 21, 2025; 19 pages.

* cited by examiner

TECHNIQUES FOR USING A SUBSTITUTE OUTPUT TRAJECTORY

CROSS-REFERENCE TO RELATED APPLICATIONS

The present application claims priority to U.S. Provisional Patent Application Ser. No. 63/541,766, entitled "TECHNIQUES FOR USING A SUBSTITUTE OUTPUT TRAJECTORY" filed Sep. 29, 2023, which is hereby incorporated by reference in its entirety for all purposes.

BACKGROUND

Electronic devices are becoming increasingly interconnected. For example, electronic devices (e.g., user devices and/or computer systems) are often connected to output components (e.g., a home accessory, a garage door, a speaker, a fan, and/or a thermostat) in the home or office. Carrying out operations via the output components sometimes involves performing output at multiple different output components simultaneously and/or with respect to the same trigger event. Controlling output of these different output components has become more difficult as the capabilities and operations of such output components have become more complicated. Accordingly, there is a need to improve techniques for controlling output components.

SUMMARY

Current techniques for controlling output components are generally ineffective and/or inefficient. For example, some techniques require users to manually configure output devices to coordinate outputs (e.g., which may not allow real-time feedback to dynamically adjust such outputs). This disclosure provides more effective and/or efficient techniques for controlling output components using an architecture for supporting coordinated trajectory planning with accessory devices in the home. It should be recognized that other architectures and/or computer systems can be used with techniques described herein. For example, controlling different output components of a smartphone can use techniques described herein. In addition, techniques optionally complement or replace other techniques for connecting electronic devices.

In some embodiments, a method that is performed at a physical output component controller of an electronic device is described. In some embodiments, the method comprises: detecting a set of one or more inputs corresponding to a request to move a movement component along a first movement trajectory; in response to detecting the set of one or more inputs, causing movement of the movement component; while causing movement of the movement component, detecting an error condition; and in conjunction with detecting the error condition: in accordance with a determination that communication between the physical output component controller and a coordinated trajectory planning component satisfies a set of one or more criteria, causing movement of the movement component along a second movement trajectory received from the coordinated trajectory planning component; and in accordance with a determination that communication between the physical output component controller and the coordinated trajectory planning component does not satisfy the set of one or more criteria, causing movement of the movement component along a third movement trajectory that is not received from the coordinated trajectory planning component, wherein the third movement trajectory is different from the second movement trajectory.

In some embodiments, a non-transitory computer-readable storage medium storing one or more programs configured to be executed by one or more processors of an electronic device is described. In some embodiments, the one or more programs includes instructions for, by a physical output component controller: detecting a set of one or more inputs corresponding to a request to move a movement component along a first movement trajectory; in response to detecting the set of one or more inputs, causing movement of the movement component; while causing movement of the movement component, detecting an error condition; and in conjunction with detecting the error condition: in accordance with a determination that communication between the physical output component controller and a coordinated trajectory planning component satisfies a set of one or more criteria, causing movement of the movement component along a second movement trajectory received from the coordinated trajectory planning component; and in accordance with a determination that communication between the physical output component controller and the coordinated trajectory planning component does not satisfy the set of one or more criteria, causing movement of the movement component along a third movement trajectory that is not received from the coordinated trajectory planning component, wherein the third movement trajectory is different from the second movement trajectory.

In some embodiments, a transitory computer-readable storage medium storing one or more programs configured to be executed by one or more processors of an electronic device is described. In some embodiments, the one or more programs includes instructions for, by a physical output component controller: detecting a set of one or more inputs corresponding to a request to move a movement component along a first movement trajectory; in response to detecting the set of one or more inputs, causing movement of the movement component; while causing movement of the movement component, detecting an error condition; and in conjunction with detecting the error condition: in accordance with a determination that communication between the physical output component controller and a coordinated trajectory planning component satisfies a set of one or more criteria, causing movement of the movement component along a second movement trajectory received from the coordinated trajectory planning component; and in accordance with a determination that communication between the physical output component controller and the coordinated trajectory planning component does not satisfy the set of one or more criteria, causing movement of the movement component along a third movement trajectory that is not received from the coordinated trajectory planning component, wherein the third movement trajectory is different from the second movement trajectory.

In some embodiments, an electronic device is described. In some embodiments, electronic device comprises one or more processors and memory storing one or more programs configured to be executed by the one or more processors. In some embodiments, the one or more programs includes instructions for, by a physical output component controller: detecting a set of one or more inputs corresponding to a request to move a movement component along a first movement trajectory; in response to detecting the set of one or more inputs, causing movement of the movement component; while causing movement of the movement component, detecting an error condition; and in conjunction with detecting the error condition: in accordance with a determination that communication between the physical output component controller and a coordinated trajectory planning component satisfies a set of one or more criteria, causing movement of the movement component along a second movement trajectory received from the coordinated trajectory planning component; and in accordance with a determination that communication between the physical output component controller and the coordinated trajectory planning component does not satisfy the set of one or more criteria, causing movement of the movement component along a third movement trajectory that is not received from the coordinated trajectory planning component, wherein the third movement trajectory is different from the second movement trajectory.

In some embodiments, an electronic device is described. In some embodiments, the electronic device comprises means for performing each of the following steps, by a physical output component controller: detecting a set of one or more inputs corresponding to a request to move a movement component along a first movement trajectory; in response to detecting the set of one or more inputs, causing movement of the movement component; while causing movement of the movement component, detecting an error condition; and in conjunction with detecting the error condition: in accordance with a determination that communication between the physical output component controller and a coordinated trajectory planning component satisfies a set of one or more criteria, causing movement of the movement component along a second movement trajectory received from the coordinated trajectory planning component; and in accordance with a determination that communication between the physical output component controller and the coordinated trajectory planning component does not satisfy the set of one or more criteria, causing movement of the movement component along a third movement trajectory that is not received from the coordinated trajectory planning component, wherein the third movement trajectory is different from the second movement trajectory.

In some embodiments, a computer program product is described. In some embodiments, the computer program product comprises one or more programs configured to be executed by one or more processors of an electronic device. In some embodiments, the one or more programs include instructions for, by a physical output component controller: detecting a set of one or more inputs corresponding to a request to move a movement component along a first movement trajectory; in response to detecting the set of one or more inputs, causing movement of the movement component; while causing movement of the movement component, detecting an error condition; and in conjunction with detecting the error condition: in accordance with a determination that communication between the physical output component controller and a coordinated trajectory planning component satisfies a set of one or more criteria, causing movement of the movement component along a second movement trajectory received from the coordinated trajectory planning component; and in accordance with a determination that communication between the physical output component controller and the coordinated trajectory planning component does not satisfy the set of one or more criteria, causing movement of the movement component along a third movement trajectory that is not received from the coordinated trajectory planning component, wherein the third movement trajectory is different from the second movement trajectory.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

Figure 1:
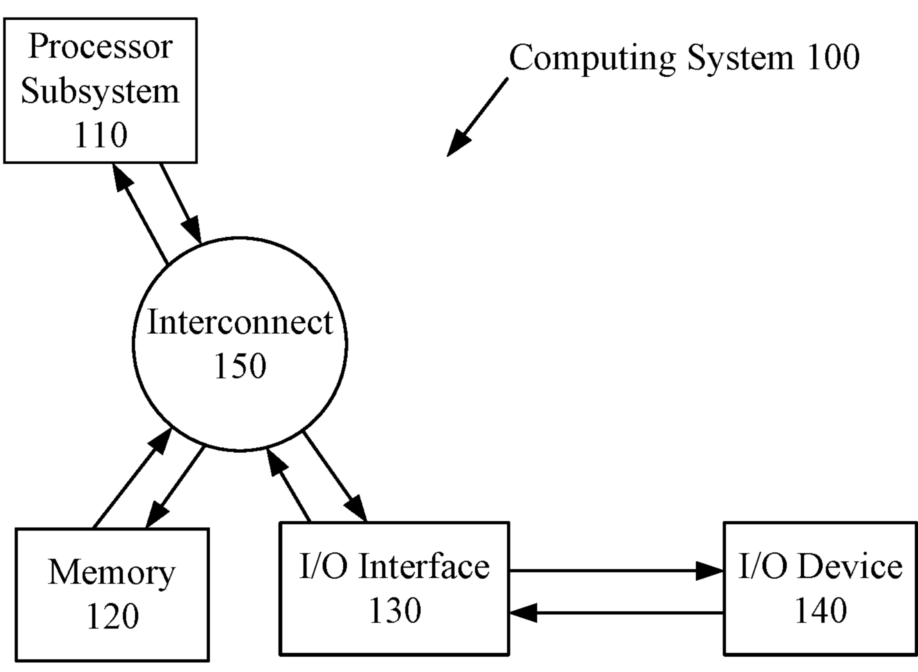
FIG. 1 is a block diagram illustrating a compute system.

The examples, descriptions, and elements disclosed within are laid out as potential embodiments to describe and expand on the claimed subject matter. It should be recognized that such examples and embodiments are not intended as limiting on the scope of the disclosure but instead are provided as a description of the claimed subject matter.

The methods disclosed herein can include one or more steps that are contingent upon one or more conditions being satisfied. It should be understood that a method can occur over multiple iterations of the same process with different steps of the method being satisfied in different iterations. A person having ordinary skill in the art would also understand that similar to a method with contingent steps, a system or computer readable storage medium can repeat the steps of a method as many times as needed to ensure that all of the contingent steps have been performed. For example, if a method requires performing a first step upon a determination that a set of one or more criteria is met and a second step upon a determination that the set of one or more criteria is not met, a person of ordinary skill in the art would appreciate that the steps of the method are repeated until both conditions, in no particular order, are satisfied.

Additionally, the methods described can be rewritten as repeating until each of the conditions described in the method are satisfied. This, however, is not required of system or computer readable medium claims where the system or computer readable medium claims include instructions for performing one or more steps that are contingent upon one or more conditions being satisfied. Because the instructions for the system or computer readable medium claims are stored in one or more processors and/or at one or more memory locations, the system or computer readable medium claims include logic that can determine whether the one or more conditions have been satisfied without explicitly repeating steps of a method until all of the conditions upon which steps in the method are contingent have been satisfied.

The present disclosure utilizes numerical descriptors to organize elements without introducing numerous unique identifiers. For example, the terms "first," "second," "third," etc. are utilized to differentiate between like elements. However, such numbering techniques are not used to be limiting, neither denote quantity nor order. For example, a first computing system could be termed a second computing system, and, without departing from the scope of the disclosure, the first computing system could be termed a computing system. Additionally, in some embodiments, the first computing system and the second computing system are two separate references to the same computing system. Alternatively, in some embodiments, the first computing system and the second computing system can be distinct computing system of the same type of computing system or different type of computing systems.

When describing particular embodiments within the present disclosure, the descriptions are enclosed for the purpose of providing clear examples and not for limiting purposes. The description of various embodiments and appended claims include the following singular terminology "a," "an," and "the." However, such terminology is intended to include the plural forms as well, unless clearly stated otherwise. Additionally, the use of "and/or" should be understood as including any and all combinations of the associated listed elements. For example, "A and/or B" includes "A," "B," and "A and B." The use of the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The present disclosure can include conditional language. When using the term "if," it should be, optionally, construed to mean "when," "upon," "in response to determining," "in response to detecting," or "in accordance with a determination that" depending on the context. Additionally, when using the phrase "if it is determined" or "if [a stated condition or event] is detected" it should be, optionally, construed to mean "upon determining," "in response to determining," "upon detecting [the stated condition or event]," "in response to detecting [the stated condition or event]," or "in accordance with a determination that [the stated condition or event]" depending on the context.

At FIG. 1, computing system 100 is illustrated through a block diagram, including a set of components. In the present disclosure, computing system 100 is used for exemplary purposes and should not be construed as limiting to one type of computing system or to one computer architecture of a computing system. The methods herein can be performed by other computer architectures and other computing systems. Computing system 100 can be any of various types of devices, including, but not limited to, a system on a chip, a server system, a personal computer system (e.g., a smartphone, a smartwatch, a wearable device, a tablet, a laptop computer, and/or a desktop computer), a sensor, or the like. Although a single computing system is shown in FIG. 1, computing system 100 can also be implemented as two or more computing systems operating together.

In some embodiments, computing system 100 is included, connected to, or in communication with a physical component for the purpose of modifying the physical component in response to an instruction. Alternatively, in some embodiments, an instruction is received by computing system 100, and in response to the instruction, computing system 100 modifies the physical component. Computing system 100 can, but is not limited to, modify the following physical components: an acceleration control, a break, a gear box, a vacuum system, a motor, a pump, a refrigeration system, a steering control, a pump, a spring, a suspension system, a hinge, and/or a valve. In some embodiments, the physical component is modified via an algorithm, another computing system, an electric signal, and/or actuator.

In some embodiments, computing system 100 includes one or more sensors. In some embodiments, computing system 100 is a sensor. In some embodiments, a sensor includes one or more components designed to obtain information about an environment. In some embodiments, a sensor can be configured to obtain information within its proximity, to obtain information through contact with the environment or an object within the environment, or to obtain information from a specified direction originating from the sensor. Some exemplary sensor components include: a flow sensor, a force sensor, a temperature sensor, a time-of-flight sensor, a leak sensor, a level sensor, a light detection and ranging system, a gas sensor, a humidity sensor, an image sensor (e.g., a radar sensor, a camera sensor, and/or a LiDAR sensor), an angle sensor, a chemical sensor, a brake pressure sensor, a contact sensor, a non-contact sensor, an electrical sensor, an inertial measurement unit, a particle sensor, a photoelectric sensor, a position sensor (e.g., a global positioning system), a precipitation sensor, a pressure sensor, a proximity sensor, a radio detection and ranging system, a radiation sensor, a speed sensor (e.g., measures the speed of an object), a metal sensor, a motion sensor, a torque sensor, and an ultrasonic sensor. In some examples, a sensor includes a combination of multiple sensors. In some embodiments, sensor data is captured by fusing data from one sensor with data from one or more other sensors. In some embodiments, a sensor can include one or more components such as a sensing component (e.g., an image sensor or temperature sensor), a transmitting component (e.g., a laser or radio transmitter), a receiving component (e.g., a laser or radio receiver), or any combination thereof.

In the current embodiment, computing system 100 includes multiple subsystems that are connected to and in communication with each other. Through interconnect 150 (e.g., a system bus, one or more memory locations, or other communication channel for connecting multiple components of computing system 100), processor subsystem 110 can communicate with (e.g., wired and/or wirelessly) memory 120 (e.g., system memory, dynamic memory, and/or virtual memory) and I/O interface 130. In some examples, multiple instances of processor subsystem 110 can be communicating via interconnect 150. Additionally, computing system 110 can communicate with additional components (e.g., I/O device 140) through I/O interface 130. In some embodiments, I/O interface 130 is included with I/O device 140 such that the two are a single component. It should be recognized that there can be one or more I/O interfaces, with each I/O interface communicating with one or more I/O devices.

Processor subsystem 110 enables computing system 100 to execute instructions to perform the exemplary disclosure laid out herein. For example, processor subsystem 110 can execute an operating system, a middleware system, one or more applications, or any combination thereof. In some embodiments, processor subsystem 110 includes one or more processors or processing units.

In some embodiments, the instructions required to perform the operations described herein are stored in memory 120 (e.g., through a connected non-transitory or transitory computer readable medium). Computing system 100 can use memory 120 to store (e.g., configured to store, assigned to store, and/or that stores) program instructions executable by processor subsystem 110. For example, memory 120 can store program instructions to implement the functionality associated with methods 800, 900, 1000, 11000, 12000, 1300, 1400, and 1500 described below.

Computing system 100 can utilize a variety of types of memory for storing instructions. In some embodiments, memory 120 can be implemented using different physical, non-transitory memory media, such as flash memory, random access memory (RAM-SRAM, EDO RAM, SDRAM, DDR SDRAM, RAMBUS RAM, or the like), hard disk storage, floppy disk storage, removable disk storage, read only memory (PROM, EEPROM, or the like), or the like.

In some embodiments, computing system 100 is not limited to memory 120 for storage. Computing system 100 can also include other forms of storage such as cache memory in processor subsystem 110 and non-processor storage through I/O interface 130 on I/O device 140 (e.g., a hard drive, storage array, etc.). In some embodiments, instructions to be executed by processor subsystem 110 to perform operations described herein can be stored on these other forms of storage. In some examples, processor subsystem 110 (or each processor within processor subsystem 110) contains a cache or other form of on-board memory.

Computing system 100 utilizes I/O interface 130 to communicate with other devices. In some embodiments, interface 130 includes various types of interfaces configured to effectively communicate with other devices. In some examples, I/O interface 130 includes a bridge chip (e.g., Southbridge) from a front-side bus to one or more back-side buses. In some embodiments, computing system 100 includes one or more I/O interfaces. In some embodiments, I/O interface 130 is capable of communicating with one or more I/O devices (e.g., I/O device 140) via one or more corresponding buses or other interfaces.

I/O devices provide additional functionality to computing system 100 through the associate hardware components included in the I/O device. Some examples of possible I/O devices include: output devices (e.g., auditory, tactile, or visual) (e.g., speaker, light, screen, projector, or the like); network interface devices (e.g., to a local or wide-area network), sensor devices (e.g., camera, ultrasonic sensor, GPS, radar, LiDAR, inertial measurement device, or the like); and storage devices (removable flash drive, storage array, hard drive, optical drive, SAN, or their associated controller). In some embodiments, computing system 100 is communicating with a network via a network interface device (e.g., configured to communicate over Wi-Fi, Bluetooth, Ethernet, or the like). In some embodiments, computing system 100 is directly or wired to the network. In some embodiments, computing system 100 is connected to I/O device 140 through a network connection (e.g., wired and/or wirelessly).

In some embodiments, computing system 100 includes an operating system to manage resources and hardware capabilities. Computing system 100 is compatible with, but not limited to, the following types of operating systems: distributed operating systems (e.g., Advanced Interactive executive (AIX), batch operating systems (e.g., Multiple Virtual Storage (MVS)), time-sharing operating systems (e.g., Unix), network operating systems (e.g., Microsoft Windows Server), and real-time operating systems (e.g., QNX). In some embodiments, the operating system provides additional capabilities to computing system 100 such as various procedures, sets of instructions, software components, and/or drivers for controlling and managing general system tasks (e.g., memory management, storage device control, power management, or the like) and for facilitating communication between hardware and software components. In some embodiments, the operating system controls the order and timing of the tasks to be executed by processor subsystem 110 through a priority-based scheduler. In such embodiments, the priority assigned to a task is used to identify a next task to execute. In some embodiments, the highest priority task runs to completion unless another higher priority task is made ready. In some embodiments, the priority-based scheduler identifies a next task to execute when a previous task finishes executing.

In some embodiments, computing system 100 includes a middleware system to provides one or more services and/or capabilities to applications (e.g., the one or more applications running on processor subsystem 110) outside of what the operating system offers (e.g., authentication, API management, data management, application services, messaging, or the like). In such embodiments, the middleware system can be configured to provide for implementation of commonly used functionality, message-passing between processes, package management, a heterogeneous computer cluster to provide hardware abstraction, low-level device control, or any combination thereof. Examples of middleware systems include, but are not limited to, Robot Operating System (ROS), Lightweight Communications and Marshalling (LCM), PX4, and ZeroMQ.

In some embodiments, the middleware system represents processes and/or operations using a graph architecture. In such embodiments, processing takes place in nodes that can receive, post, and multiplex state messages, planning messages, actuator messages, sensor data messages, control messages, and other messages. In such examples, the graph architecture can define an application (e.g., an application executing on processor subsystem 110 as described above) such that different operations of the application are included with different nodes in the graph architecture.

In some embodiments, a publish-subscribe model is used to provide communication between a first node in a graph architecture to a second node in the graph architecture. In such embodiments, the first node publishes data on a channel in which the second node can subscribe. In some embodiments, the first node can store data in memory (e.g., memory 120 or some local memory of processor subsystem 110) and send an acknowledgement to the second node that the data has been stored in memory. In some embodiments, the first node provides a pointer (e.g., a memory pointer, such as an identification of a memory location) to the second node so that the second node can directly access the memory location where the first node stored the data. In some embodiments, the first node does not need to store the data in memory and provides the second node the data directly, as to not require memory access (e.g., by the first node or the second node).

Figure 2:
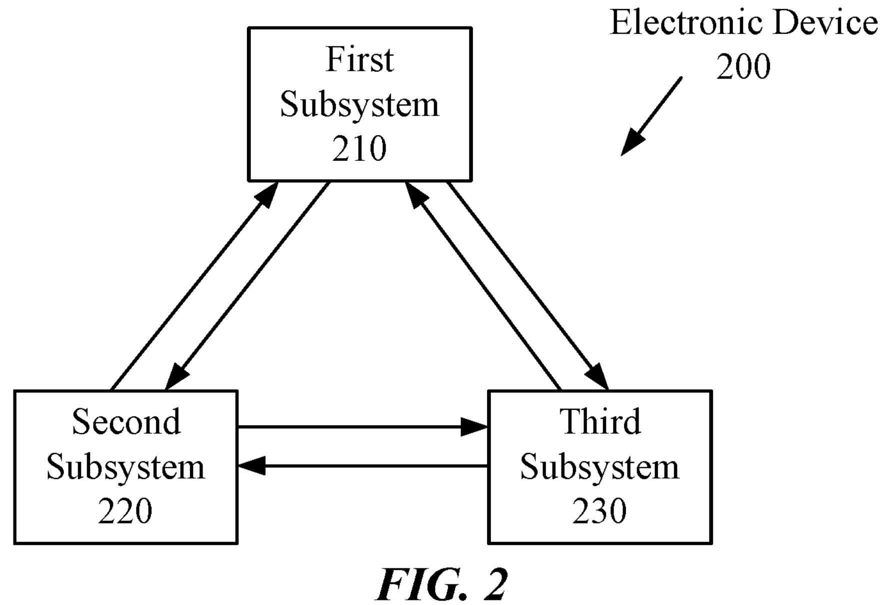
FIG. 2 is a block diagram illustrating a device with interconnected subsystems.

FIG. 2 illustrates a block diagram of electronic device 200 with interconnected subsystems. In the illustrated embodiment, electronic device 200 includes three different subsystems (i.e., first subsystem 210, second subsystem 220, and third subsystem 230). The subsystems of electronic device 200 are in communication with (e.g., wired or wirelessly) each other, and create a network (e.g., a storage area network, an enterprise internal private network, a campus area network, a personal area network, a local area network, a virtual private network, a wireless local area network, a metropolitan area network, a wide area network, a system area network, and/or a controller area network). Each subsystem of electronic device 200 can be configured or designed with the computer architecture as described in FIG. 1 (i.e., computing system 100). Additionally, while in the illustrated embodiment electronic device 200 contains three subsystems, electronic device 200 can be configured with additional or fewer subsystems.

In some embodiments, electronic device 200 includes alternative layouts or connectivity of electronic device 200's included subsystems. For example, first subsystem 210 connected to second subsystem 220 but not third subsystem 230, or second subsystem 220 connected to third subsystem 230 but not first subsystem 210. In some embodiments, electronic device 200's subsystems are electrically connected while additional subsystems are wireless connected to electronic device 200. In some embodiments, subsystems of electronic device 200 are configured to send messages between and receive messages from other subsystems of electronic device 200. In some embodiments, the subsystems can be configured to communicate wirelessly to the one or more computer systems outside of device 200. In such embodiments, one or more subsystems are wirelessly connected to one or more computer systems outside of device 200, such as a server system.

In some embodiments, one or more subsystems of electronic device 200 are used to control, manage, and/or receive data from one or more other subsystems of electronic device 200 and/or one or more additional computer systems (e.g., electrically connected or remote from electronic device 200). For example, first subsystem 210 and second subsystem 220 can each be a camera that captures images, and third subsystem 230 can use the captured images for decision making. In some embodiments, at least a portion of electronic device 200 functions as a distributed computer system. For example, a first portion of a task is executed by first subsystem 210 and a second portion of the task is executed by second subsystem 220.

In some embodiments, electronic device 200 includes an enclosure that fully or partially houses electronic device 200's subsystems (e.g., subsystems 210-230). Potential enclosures include, but are not limited to, a head-mounted-display device, a smart display, a home-appliance device (e.g., a refrigerator or an air conditioning system), an accessory device, a smart phone, a smart watch, a robot (e.g., a robotic arm or a robotic vacuum), and a vehicle. In some embodiments, electronic device 200 is capable of navigating a physical environment with or without user input.

Attention is now directed towards techniques for controlling output components. Such techniques are described in the context of components of an electronic device (e.g., and/or system). It should be recognized that other types of components, electronic devices, and/or systems can be used with techniques described herein. For example, an accessory can connect with a smartphone using techniques described herein. For another example, a vehicle can control different components of the vehicle using techniques described herein. In addition, techniques optionally complement or replace other techniques for controlling output components.

Figure 3A:
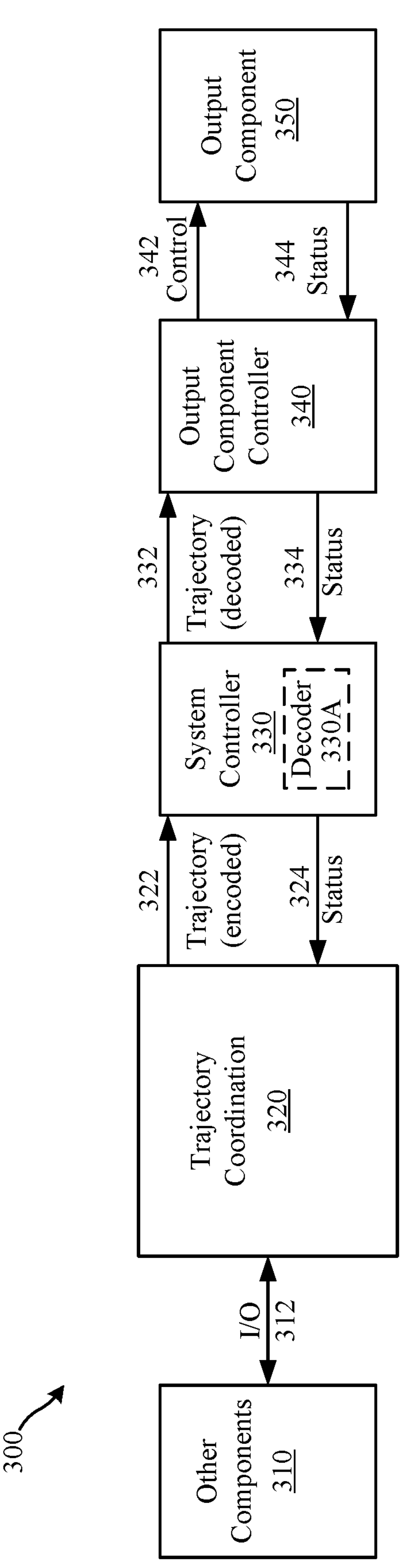
FIGS. 3A-3C are block diagrams illustrating exemplary components of an electronic device for implementing a coordinated trajectory control scheme, in accordance with some embodiments.
Figure 3B:
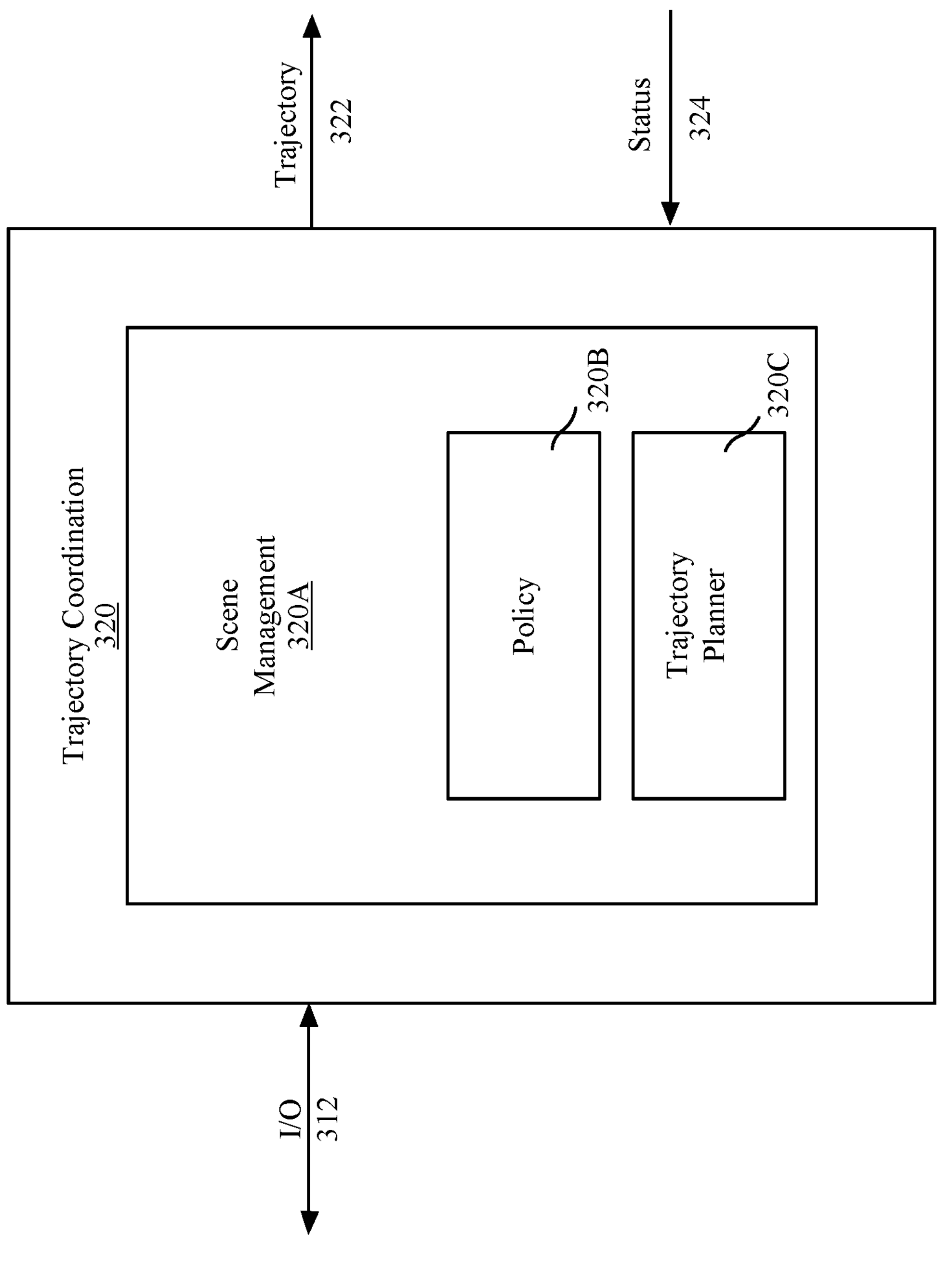
Figure 3C:
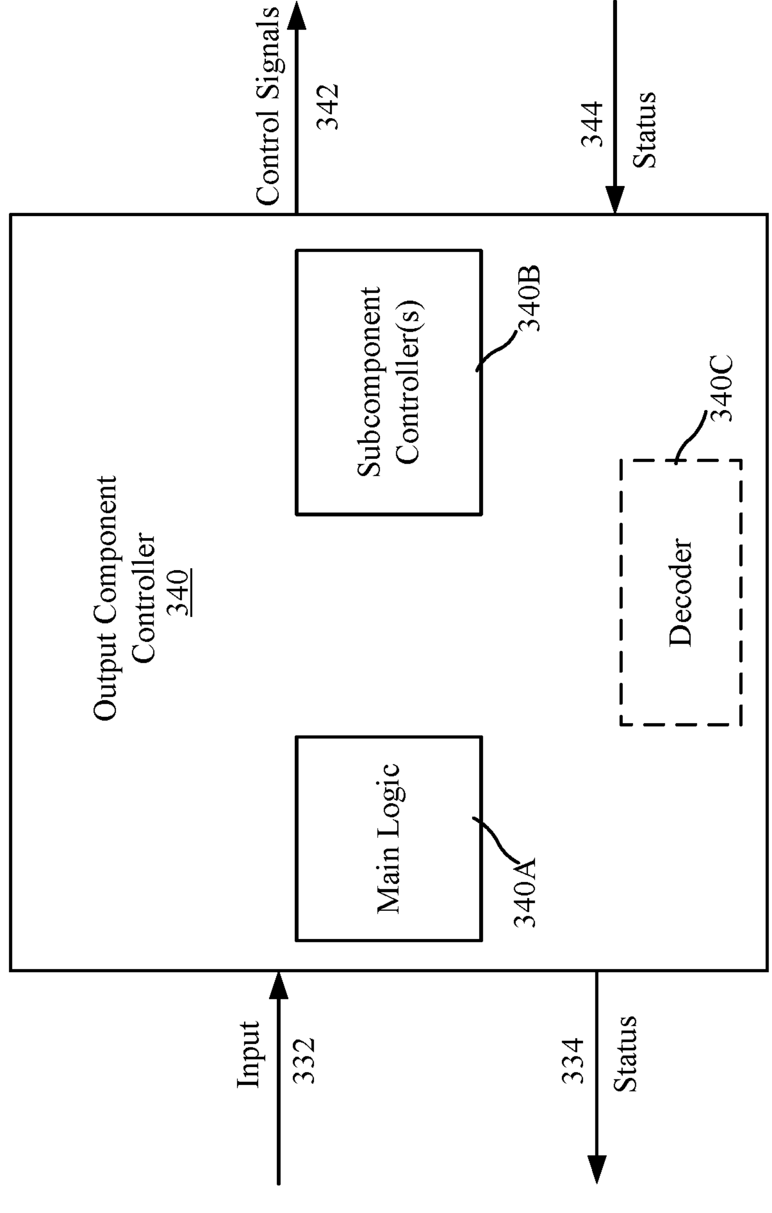

FIGS. 3A-3C illustrate exemplary components of an electronic device for implementing a coordinated trajectory control scheme, in accordance with some embodiments. The components illustrated in FIGS. 3A-3C can be implemented in hardware, software, or a combination of both. The components illustrated in FIGS. 3A-3C can be implemented via an electronic device (e.g., such as compute system 100, device 200, and/or an electronic device including one or more of the features described above with respect to compute system 100 and/or device 200).

In some embodiments, the electronic device is one or more of (and/or includes one or more features of): a watch, a phone, a tablet, a fitness tracking device, a processor, a head-mounted display (HMD) device, a home automation device (e.g., controller and/or hub), a communal device (e.g., a multi-user device), a media device, a motor electronic device, a wearable electronic device, an autonomous and/or semi-autonomous electronic device, a speaker, a television, a self-propelled device, and/or a personal computing device. In some embodiments, the electronic device is in communication with one or more input devices (e.g., a communications receiving component, a camera, a depth sensor, a microphone, a hardware input mechanism, a rotatable input mechanism, a heart monitor, a temperature sensor, and/or a touch-sensitive surface) and/or one or more output devices (e.g., a communications transmission component, a light output component, a movement component, a display generation component, an audio generation component, a speaker, a haptic output device, a display screen, a projector, and/or a touch-sensitive display).

FIG. 3A illustrates block diagram 300 of an exemplary component architecture (e.g., of a device and/or system) for implementing a coordinated trajectory control scheme. In some embodiments, a coordinated trajectory control scheme enables a central component (e.g., trajectory coordination component 320) to coordinate output trajectories of multiple different output components (e.g., output component 350). In some embodiments, the multiple different output components are controlled by multiple different output controllers (e.g., including and/or similar to output component controller 340). In some embodiments, each of these output component controllers can operate independent of each other and/or the central component. For example, an output component controller can receive look-ahead trajectories for an output component and cause output to be performed according to the look-ahead trajectories, even if communication is lost between the central component and/or other output component controllers. As another example, the output component controller can make decisions regarding output trajectories without (and/or while in) communication with the central component.

Providing look-ahead trajectories (e.g., trajectories that can be performed without additional communications) and/or enabling an output component controller to perform a trajectory without requiring further communications can (1) reduce the burden on communication resources by reducing demand on centralized resources to stream control signals to output components and/or (2) reduce the burden on communication resources by reducing traffic and/or bandwidth usage of communication infrastructure (e.g., communication mediums, buses, lines, networks, and/or cables). These reductions in burden on communication resources and/or infrastructure can be important in scenarios where many output components share centralized coordination resources and/or communication infrastructure. Examples of such scenarios can include home and/or building automation networks with many output components. In such networks, output of components of the network can be "animated" (e.g., perceived by a user, such as visually) and/or "coordinated" (e.g., performed in a synchronized, matching, and/or relative manner) based on trajectories. In some embodiments, components of a network include one or more "smart home" accessories for causing outputs, such as lighting and/or lighting controllers, windows, opacity controllers, hinged doors, sliding doors, garage doors, door locks, window panels, window shades, standing desks, reclining chairs, projectors, air conditioning, air vents, sprinklers, vacuums, lawnmowers, seasonal decorations, indoor lighting, and/or outdoor lighting. In some embodiments, the techniques described herein can be implemented by a smartphone coordinating and sending a trajectory to a home automation controller (e.g., a home hub, smart speaker, and/or or other multi-user device) that is paired with specific home accessories that can be controlled by the home automation controller (and/or the smartphone sending trajectories directly to such home accessories).

With the number of home automation accessories growing, the resources needed to coordinate output between such accessories can be more demanding, which can in turn put a tax on shared network resources. While the examples provided immediately above with respect to a home automation network relate to a distributed network of components that are separate devices (e.g., coordination controller is a smartphone but a component is a garage door opener), one of ordinary skill in the art can and should understand that the same issues can arise in the scenario in which the components are each part of a single electronic device (and/or a single network of two or more electronic devices) (e.g., a single computer system that includes components for causing movement and/or lighting output that is configured with a centralized coordination component).

Block diagram 300 of FIG. 3A includes other components 310, which represents one or more additional functional components of the electronic device outside of the functional components illustrated in FIG. 3A. For example, other components can include user interface components (e.g., display generation components, touchscreen displays, physical and/or virtual controls, input devices, and/or output devices), processors, memory, I/O components, communications components, and/or other logical and/or architectural components. In some embodiments, other components 310 communicates with trajectory coordination component 320 (and/or other components described herein) via connection 312 (e.g., for exchanging input and/or output data). For example, input can be received via and/or provided by one or more components of other components 310 to trajectory coordination component 320 via connection 312. In response to receiving the input from other components 310, trajectory coordination component 320 can determine, update, and/or otherwise perform an operation for a set of coordinated trajectories. In some embodiments, trajectory coordination component 320 provides data to other components (e.g., for updating a display generation component) via connection 312.

Block diagram 300 of FIG. 3A illustrates trajectory coordination component 320, which is also referred to herein as a "coordinated trajectory planning component." In some embodiments, trajectory coordination component 320 is a component that determines trajectories for one or more output components of and/or in communication with the electronic device. In some embodiments, trajectory coordination component 320 determines output trajectories that are coordinated between different output components (e.g., of the same and/or different type). An output trajectory is also referred to herein as a "trajectory," a "physical trajectory," a "physical output trajectory," an "animation trajectory," and/or an "animation output." In some embodiments, an output trajectory is coordinated in time, position, speed, amplitude, mode, and/or output level with one or more other output trajectories (e.g., where the trajectories are subject to execution times that are configured to create the appearance of coordination between output components to an observer). In some embodiments, an output trajectory includes (and/or corresponds to) one or more target execution times. In some embodiments, the one or more target execution times indicate timing of one or more portions of the output trajectory. For example, the timing can specify when the output trajectory should begin being performed, when it should finish being performed, and/or when any intermediate operations within the trajectory should be performed (e.g., a transition point when light output should change color output).

In some embodiments, trajectory coordination component 320 is implemented via one or more hardware components and/or one or more software components. In some embodiments, trajectory coordination component 320 is implemented as part of one or more other components (and/or includes one or more other components), such as: a user interface compute component and/or a scene controller (e.g., for processing and/or enforcing one or more scene definitions (e.g., a trigger, a condition, and/or timing) (e.g., a scene being a set of one or more trajectories (e.g., a predetermined set and/or procedurally generated set)).

In some embodiments, trajectory coordination component 320 determines a set one or more trajectories (e.g., output and/or motion modes) for an output component (e.g., an object and/or a device (such as an actuator)) in response to user input, object input, and/or scene definition. In some embodiments, trajectory coordination component 320 determines a state of an object from a reported status (e.g., actuator is active and/or window is open). In some embodiments, trajectory coordination component 320 invokes a coordinated trajectory planning operation for an output component in communication with the electronic device. In some embodiments, trajectory coordination component 320 coordinates one or more animations across different objects and/or one or more output components in communication with the electronic device. In some embodiments, trajectory coordination component 320 re-plans one or more trajectories in response to feedback (e.g., from the output component and/or one or more other output components and/or from other components 310) using a coordinated trajectory planning operation (e.g., using scene definitions and/or coordinated trajectory policies to determine coordinated trajectories). In some embodiments, trajectory coordination component 320 provides trajectories (e.g., encoded trajectories) to system controller 330 via connection 322.

Block diagram 300 of FIG. 3A illustrates system controller 330. In some embodiments, system controller 330 manages and/or provides data flow between components of the electronic device (e.g., between trajectory coordination component 320 and output component controller 340). In some embodiments, system controller 330 includes decoder component 330A (also referred to herein as a "trajectory decoding component"), which is a component for decoding output trajectories. For example, decoder component 330A can decode an encoded output trajectory received from trajectory coordination component 320 and then a decoded output trajectory 332 is provided (e.g., streamed and/or sent) to output component controller 340. In some embodiments, decoder component is implemented via one or more hardware components and/or one or more software components.

In some embodiments, system controller 330 provides status information (e.g., data, feedback, and/or state information) to trajectory coordination component 320 (e.g., for use updating states and/or trajectories corresponding to one or more output components) via connection 324. In some embodiments, system controller 330 provides trajectories (e.g., encoded and/or decoded trajectories) to output component controller 340 via connection 332.

Block diagram 300 of FIG. 3A illustrates output component controller 340 (also referred to herein as a "physical output component controller"). In some embodiments, output component controller 340 is a component (e.g., that controls a set of one or more physical output components) (e.g., implemented via one or more hardware components and/or one or more software components) of the electronic device. In some embodiments, output component controller 340 includes logic to control one or more output components (e.g., a mechanism, such as a collection of joints), arbitrate requests to trajectory coordination component 320, monitor safety conditions, and/or plan trajectories itself such as when trajectory coordination component 320 is offline (e.g., not responding and/or not reachable). In some embodiments, output component controller 340 is (and/or is part of and/or includes) a body controller. In some embodiments, output component controller 340 provides status information (e.g., data, feedback, and/or state information) to system controller 330 (e.g., and/or to trajectory coordination component 320) (e.g., for use updating states and/or trajectories corresponding to one or more output components) via connection 334. In some embodiments, output component controller 340 provides control signals (e.g., portions of trajectories (e.g., decoded trajectories)) to output component 350 via connection 342.

Block diagram 300 of FIG. 3A illustrates output component 350 (also referred to herein as a "physical output component"). In some embodiments, output component 350 is a component that is operable to and/or used to cause a physical output (e.g., physical movement, light output, sound output, haptic output, and/or opacity change). In some embodiments, output component 350 includes (or excludes) one or more controllers (e.g., an output component controller and/or a body controller). For example, output component controller 340 and output component 350 can be different functional components of the same physical component or of different physical components (e.g., that is in communication with (e.g., part of, connected to, coupled to, and/or controlled by) the electronic device)). In some embodiments, output component 350 includes (and/or is) a movement component. In some embodiments, output component 350 includes (and/or is) a non-movement component (e.g., a light and/or an opacity controller and/or device). In some embodiments, output component 350 provides status information (e.g., data, feedback, and/or state information) to output component controller 340 (e.g., and/or to trajectory coordination component 320) (e.g., for use updating states and/or trajectories corresponding to one or more output components) via connection 344.

In some embodiments, block diagram 300 is embodied as (e.g., represents a portion and/or all of) an electronic device (e.g., 100 and/or 200). In some embodiments, output component 350 is a component of the electronic device. In some embodiments, output component 350 is external to the electronic device. In some embodiments, output component 350 is (and/or includes) one or more of a motor, a mechanical joint, a physical linkage, a light, and/or an opacity adjustment component (e.g., that controls opacity of a surface that transmits and/or passes light).

In some embodiments, the electronic device includes a plurality of output component controllers as described above with respect to output component controller 340 (e.g., each connected to system controller 330 and one or more other output components as described herein with respect to output component 350). For example, block diagram 300 can include multiple output component controllers (e.g., 340).

In some embodiments, the electronic device causes movement of a plurality of movement components (e.g., including the movement component) according to a plurality of movement characteristics of one or more output trajectories (e.g., including the output trajectory). For example, block diagram 300 can include multiple output components (e.g., 350).

FIG. 3B illustrates a detailed view of trajectory coordination component 320. In addition to features already described with respect to FIG. 3A, FIG. 3B illustrates functional components representing capabilities and/or features of trajectory coordination component 320. In some embodiments, trajectory coordination component 320 includes scene management component 320A that performs operations for implemented scenes. In some embodiments, a scene is (and/or includes, defines, and/or provides rules for) a set of one or more output trajectories. For example, a scene can be associated with an event representing when a user arrives back home daily from work, and include predetermined trajectories for a garage door (e.g., move from closed to open when the user pulls into a driveway), for an entry door (e.g., unlock and/or actuate to open the door), a set of indoor lights (e.g., linearly increase light brightness from 0% to 100% as the user walks through the entry door), and a smart speaker (e.g., begin playing back music and linearly increase volume from 0% to 30%). In some embodiments, a scene corresponds to a context, event, and/or other trigger. For example, the scene can automatically be triggered by a detected context (e.g., detecting that a user is arriving home), an event (e.g., user presses a control to announce they are arriving home), and/or another trigger such as user input.

In some embodiments, trajectory coordination component 320 includes policy component 320B (also referred to herein as a "policy management component") that performs operations for managing policies (also referred to herein as "trajectory policies," "motion policies," "animation policies," and/or "output trajectory policies"). In some embodiments, determining a set of output trajectories includes using a set of one or more motion policies that specify coordination (e.g., synchronization and/or relative timing of output) between output trajectories of the two or more output components.

In some embodiments, trajectory coordination component 320 includes trajectory planner 320C (also referred to herein as an "animation planner") for generating and/or coordinating output trajectories (e.g., to comply with a scene definition and/or an applicable policy), for example, as described above (and/or elsewhere herein).

While depicted as functional subcomponents of trajectory coordination component 320, scene management component 320A, policy component 320B, and/or trajectory planner 320C can be implemented as separate components and/or combined in any arbitrary way that enables the functionality described herein to be performed.

FIG. 3C illustrates a detailed view of output component controller 340. In addition to features already described with respect to FIG. 3A, FIG. 3C illustrates functional components representing capabilities and/or features of output component controller 340. In some embodiments, output component controller 340 includes main logic component 340A that performs operations for performing (and/or causing performance of, by one or more output components) output trajectories. For example, returning to the example of the scene associated with when a user arrives back home daily from work, output component controller 340 can control an output component for actuating to open (and/or close) an entry door. In this example, output component controller 340 can apply control signals (e.g., via connection 342) to an output component that actuates a motor and mechanical linkage to physically move the entry door open. In some embodiments, output component controller 340 includes one or more subcomponent controller(s) 340B. For example, output component controller 340 can manage an output component that includes subcomponents that each have an associated trajectory and/or that require separate controller components for applying control signals (e.g., an output component that includes a movement component and a lighting component that are separately controllable). For simplicity, subcomponents can be considered (and/or referenced herein) as a combined output component (e.g., controlled by output component controller 340 and subcomponent controller(s) 340B) and/or different output components (e.g., each controlled by a separate controller), however, either of such conceptions used should not be construed as limiting the actual physical implementation of such components.

In some embodiments, output component controller 340 includes decoder component 340C. In some embodiments, decoder component 340C includes one or more of the features described above with respect to decoder component 330A. For example, in the scenario in which output component controller 340 includes decoder component 340C, output component controller 340 can receive encoded versions of trajectories and perform decoding (e.g., rather than system controller 330 performing decoding and streaming the decoded trajectory to output component controller 340). In some embodiments, an output trajectory is encoded and/or decoded in a form that can be ingested, interpreted, understood, used, executed, and/or applied by an output component and/or a controller in communication with the output component.

Figure 4A:
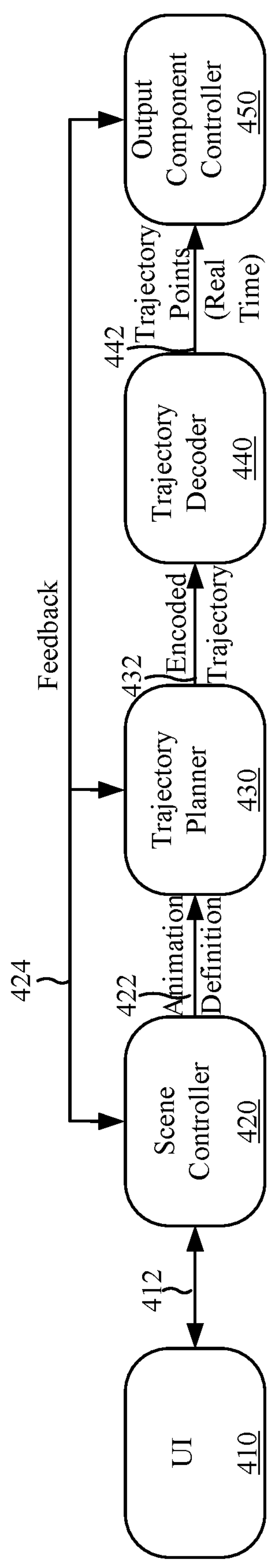
FIGS. 4A-4C are block diagrams illustrating exemplary functional component architectures for implementing trajectory control of output components, in accordance with some embodiments.
Figures 4B, 4C:
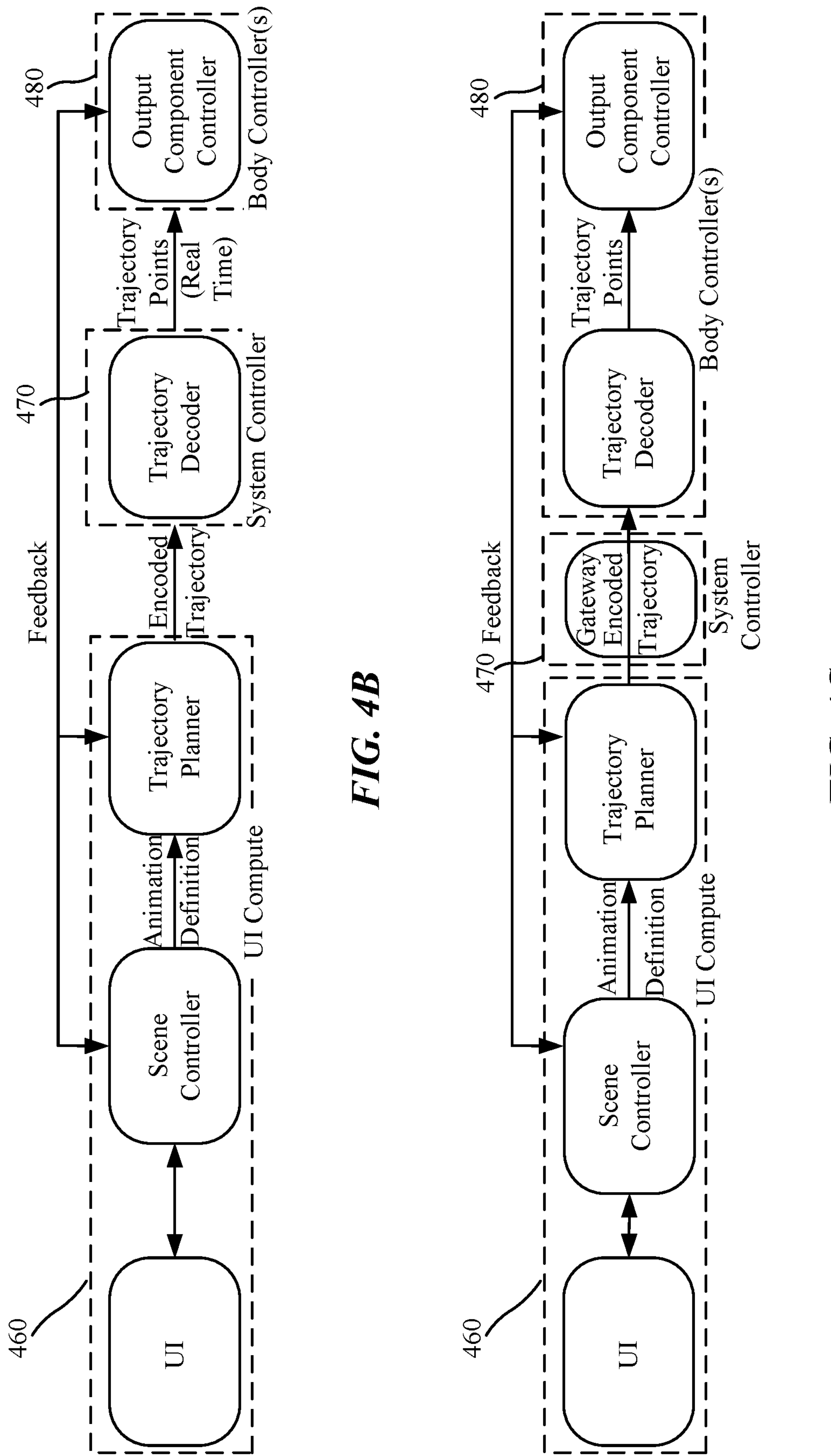

FIGS. 4A-4C illustrate exemplary functional component architectures for implementing trajectory control of output components, in accordance with some embodiments. FIGS. 4A-4C are included to illustrate the flow of data between functional components and to illustrate exemplary groupings of functional components on different hardware components (e.g., each grouping on a hardware component) (and/or the same hardware component) (e.g., of one or more electronic devices).

FIG. 4A illustrates block diagram 400 of functional blocks for implementing control of output trajectories, in accordance with some embodiments. In some embodiments, functional architecture 400 includes user interface component 410 (e.g., including one or more other components 310 as described with respect to FIG. 3A). In some embodiments, functional architecture 400 includes scene controller 420 (e.g., for performing the functions of scene management component 320A and/or policy component 320B of FIG. 3B). In some embodiments, functional architecture 400 includes trajectory planner 430 (e.g., for performing the functions of trajectory planner component 320C of FIG. 3B). In some embodiments, functional architecture 400 includes trajectory decoder 440 (e.g., for performing the functions of decoder component 330A of FIG. 3A). In some embodiments, functional architecture 400 includes output component controller 450 (e.g., for performing the functions of output component controller 350 of FIG. 3A).

FIG. 4A illustrates the flow of data between functional components. As illustrated in FIG. 4A, scene controller 420 can provide visual and audio output 412 to user interface component 410 (e.g., for display and or output as audio, for example, to represent the state of the device and/or one or more output components). As illustrated in FIG. 4A, scene controller 420 can receive feedback 424 from output component controller 450 (e.g., for managing scenes). As illustrated in FIG. 4A, trajectory planner 430 can receive animation definitions 422 from scene controller 420 (e.g., for use in generating and/or coordinating trajectories). As illustrated in FIG. 4A, trajectory planner 430 can receive feedback 424 from output component controller 450 (e.g., for use in updating state data and/or generating trajectories). As illustrated in FIG. 4A, trajectory decoder 440 can receive encoded trajectory 432 from trajectory planner 430 (e.g., for decoding). As illustrated in FIG. 4A, output component controller 450 can receive trajectory points 442 from trajectory decoder 440 (e.g., as a stream).

FIG. 4B illustrates a first exemplary architecture for implementing the functional blocks of block diagram 400 of FIG. 4A, in accordance with some embodiments. As illustrated in FIG. 4B, the functions of user interface component 410, scene controller 420, and trajectory planner 430 are implemented by the same component: user interface (UI) compute component 460. In some embodiments, UI compute component 460 performs one or more operations for managing user interfaces and/or user experiences with respect to an electronic device. As illustrated in FIG. 4B, the functions of trajectory decoder 440 are implemented on system controller 470 (e.g., that includes one or more features as described above with respect to system controller 330 of FIG. 3A). In the example illustrated in FIG. 4B, system controller 470 performs decoding of encoded trajectories, and streams trajectory points to body controller 480. As illustrated in FIG. 4B, the functions of output component controller 450 are implemented on body controller 480 (e.g., that includes one or more features as described above with respect to output component controller 340 of FIGS. 3A and/or 3B). In the example illustrated in FIG. 4B, body controller 470 receives decoded points (e.g., which are translated to control signals for controlling an output component). For example, implementing the decoding functions at system controller 470 can reduce processing demand on the body controller (e.g., which otherwise might need to perform resource-intensive trajectory decoding that necessitates more complicated hardware and/or software resources).

FIG. 4C illustrates a second exemplary architecture for implementing the functional blocks of block diagram 400 of FIG. 4A, in accordance with some embodiments. Similar to FIG. 4B, FIG. 4C illustrates the functions of user interface component 410, scene controller 420, and trajectory planner 430 as implemented by UI compute component 460. As illustrated in FIG. 4C, system controller 470 functions as a gateway (e.g., intermediary, switch, and/or router) between UI compute component 460 and body controller 480, however, does not perform decoding functionality. As illustrated in FIG. 4C, the functions of trajectory decoder 440 are implemented on body controller 480. Similar to FIG. 4B, in FIG. 4C, the functions of output component controller 450 are implemented on body controller 480 (e.g., that includes one or more features as described above with respect to output component controller 340 of FIGS. 3A and/or 3B). In the example illustrated in FIG. 4C, body controller 480 receives the trajectories in encoded form points, which are then decoded by body controller 480. In some embodiments, the encoded trajectories are provided by system controller 470 in a non-streamed manner (e.g., as a look-ahead trajectory that is in encoded form). For example, implementing the decoding functions at body controller 480 can reduce (and/or efficiently group) demand on a communication link between body controller 480 and system controller 470 (e.g., which would not need to provide real time streaming of trajectory points). For example, implementing the decoding functions at body controller 480 can reduce processing demand on a system controller (e.g., which otherwise might need to perform resource-intensive trajectory decoding for multiple output components within a short period (e.g., if a complicated scene is involved)).

Figure 5A:
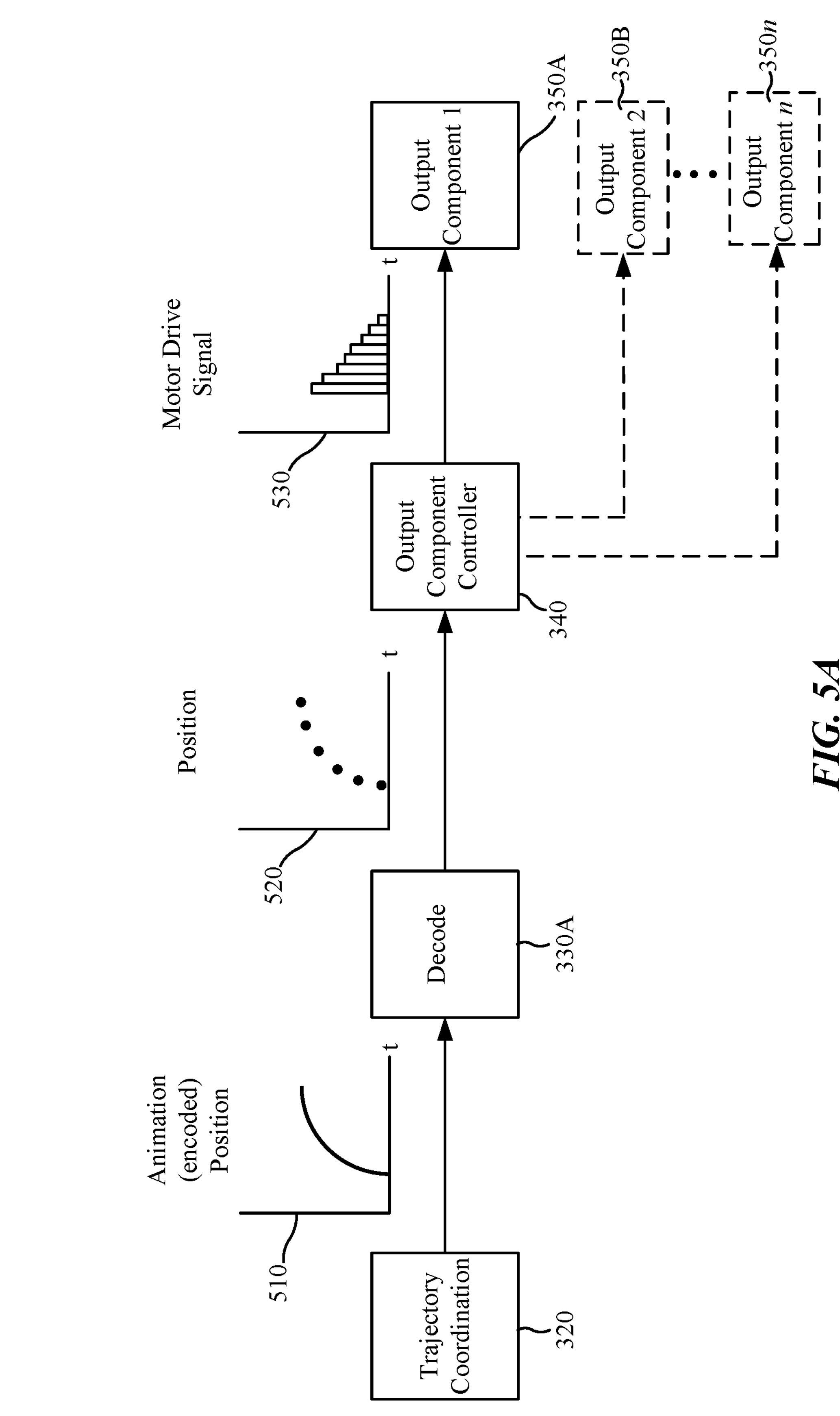
FIGS. 5A-5C are diagrams illustrating exemplary trajectories in accordance with some embodiments.
Figure 5B:
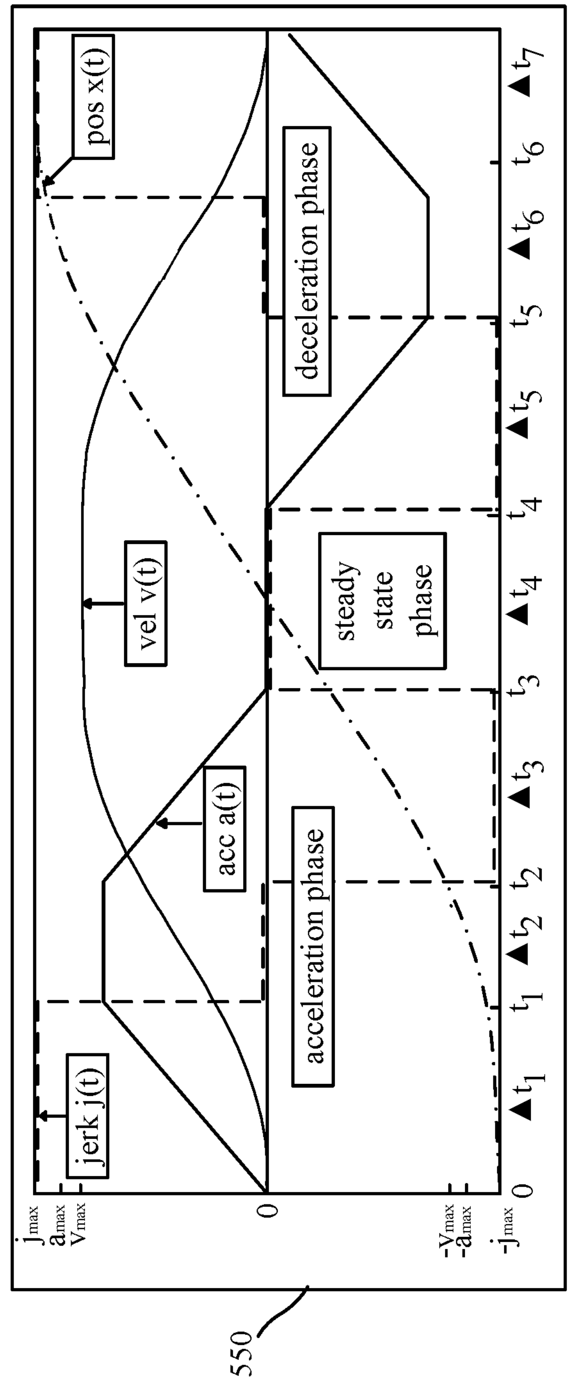
Figure 5C:
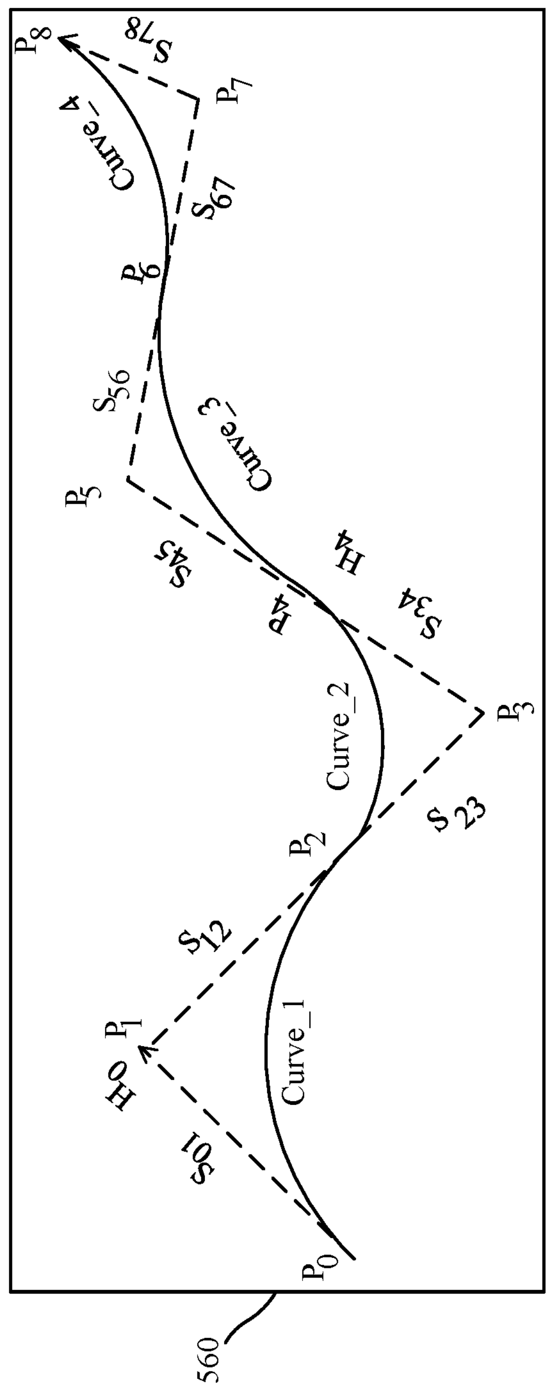

FIGS. 5A-5C illustrate exemplary trajectories in accordance with some embodiments. In particular, FIG. 5A illustrates the form that an output trajectory can take as it makes moves between components of the architecture as described herein. FIG. 5A illustrates encoded trajectory 510. In some embodiments, a trajectory is encoded by being represented as a parameterized curve (e.g., a parametric curve such as a Bézier curve). As illustrated in FIG. 5A, trajectory coordination component 320 provides encoded trajectory 510 to decoder component 330A, which decodes it into decoded trajectory 520. As illustrated in FIG. 5A, decoded trajectory 520 is a series of points (e.g., positions) that approximates (e.g., represents) a sampling of the parameterized curve (e.g., encoded trajectory 510). In this example, decoded trajectory 520 is provided to output component controller 340 (e.g., as a stream of points). After receiving decoded trajectory 520, output component controller 340 can transform (e.g., transcode and/or translate) the trajectory into control signals for causing output at an output component. As illustrated in FIG. 5A, output component controller 340 provides motor drive signals 530, for implementing the trajectory represented by encoded trajectory 510 and decoded trajectory 520. For example, as illustrated by motor drive signals 530 in FIG. 5A, a large amplitude control signal is initially applied to overcome inertia of a movement component being static, and the controls signals reduce in amplitude as the movement component nears the goal position of the trajectory. While the example of a motor is used with respect to the example in FIG. 5A, control signals can be used to control other output components such as lights or others mentioned herein. As illustrated in FIG. 5A, output component controller 340 can be connected to (e.g., and a controller of) a set of one or more output components (e.g., 350A, 350B, . . . to 350*n*).

FIGS. 5B-5C illustrate example trajectories in accordance with some embodiments. FIG. 5B illustrates plot 550, which represents a jerk-limited output trajectory (e.g., a trajectory for a movement component that limits jerking movement). In some embodiments, jerking movement is movement that includes sudden changes in direction and/or acceleration that create "jerk" (e.g., high amplitude of acceleration). In some embodiments, a jerk-limited output trajectory is used where a path from current position to a target position is unknown (e.g., an electronic device is causing movement that relies on environmental feedback to reach a goal location). As illustrated in FIG. 5B, a jerk limit ($j_{max}$) of a jerk function j(t), an acceleration limit ($a_{max}$) of an acceleration function a(t), and a velocity limit ($v_{max}$) of a velocity function v(t) can be used to determine a position trajectory (e.g., indicated by x(t)) in a manner that satisfies the corresponding limits. Reducing jerking motion can increase lifespan and/or reliability of output components and/or provide a better user experience.

FIG. 5C illustrates plot 560, which represents a Bézier curve output trajectory. In some embodiments, a Bézier curve output trajectory is a trajectory based on and/or created using one or more Bézier curve (e.g., a type of parametric curve) (e.g., a curve defined by a set of control points to create a smooth curve using a formula). As illustrated in FIG. 5C, the Bézier curve output trajectory is created from four curves (Curve_1, Curve_2, Curve_3, and Curve_4) that are arranged contiguously to form a trajectory. In this example, each of the four curves is defined by control points (e.g., $P_0$, $P_1$, $P_2$, $P_3$, $P_4$, $P_5$, $P_6$, $P_7$, and/or $P_8$). In some embodiments, Bézier curve output trajectory is used as a trajectory for controlling light output of a lighting component.

In some embodiments, output trajectories can include one or more of: a preset output trajectory (e.g., a predefined output trajectory), a manual motion output trajectory (e.g., an output trajectory created by user input (e.g., drawn and/or specified by user input)), and/or an acceleration limited output trajectory (e.g., a trajectory for a movement component that limits a characteristic of acceleration (e.g., rate of change of acceleration, maximum and/or minimum acceleration, and/or a fixed rate of acceleration)).

Figure 6:
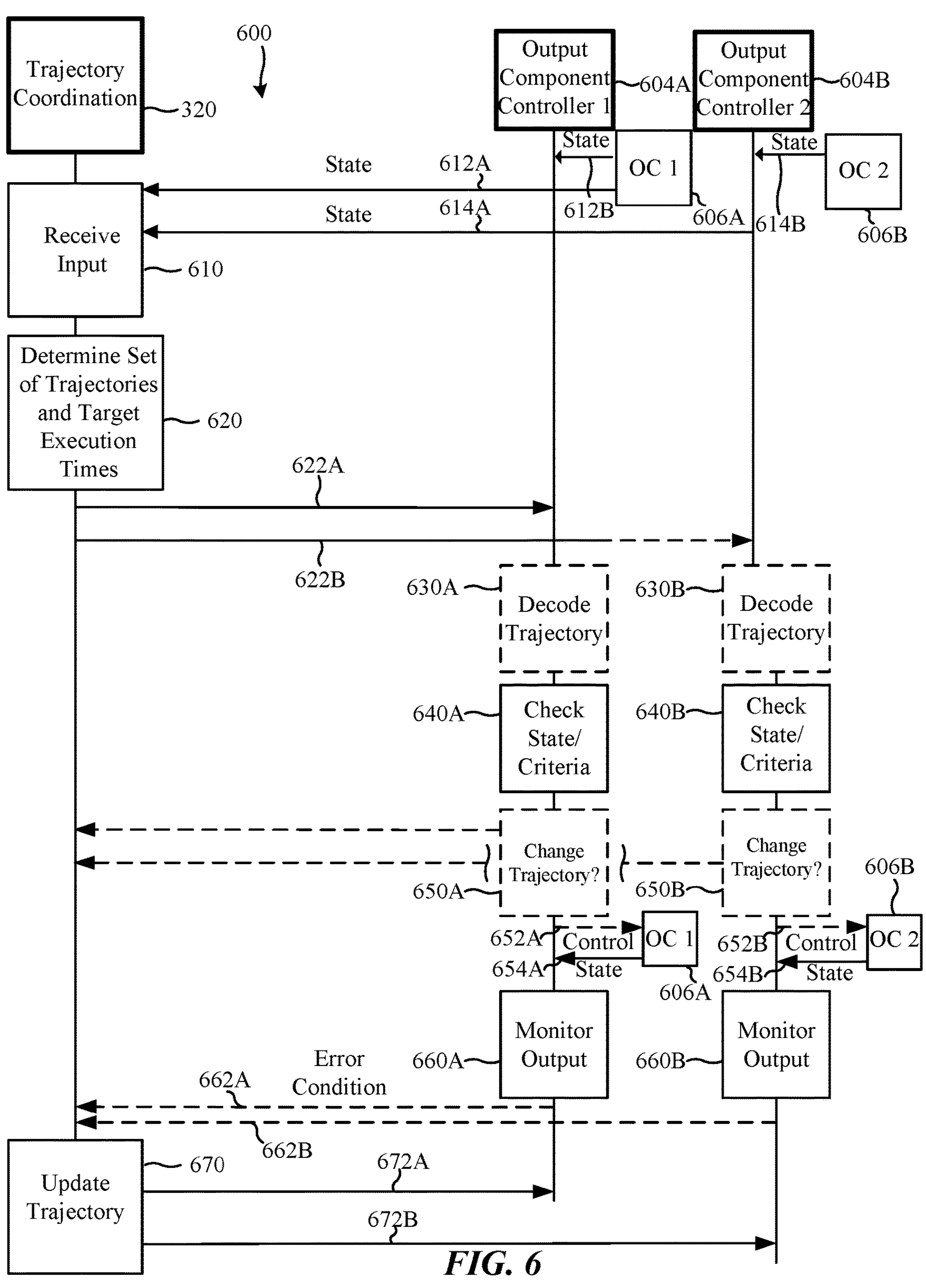
FIG. 6 is a communication flow diagram for controlling output trajectories, in accordance with some embodiments.

FIG. 6 illustrates communication flow diagram 600 for controlling output trajectories, in accordance with some embodiments.

In some embodiments, the operations described with respect to communication flow diagram 600 can be performed by one or more components of an electronic device (e.g., compute system 100 and/or device 200). In this example, the operations are performed by trajectory coordination component 320 (e.g., 320 of FIG. 3A), first output component controller 604A (e.g., 340 of FIG. 3A), and second output component controller 604B (e.g., 340 of FIG. 3A). The example illustrated by the operations in communication flow diagram 600 are presented in temporal progression from top to bottom (e.g., operations near top happen before operations near bottom in FIG. 6). It should be understood that some operations can occur in a different order than that which is illustrated in FIG. 6.

In the example illustrated in FIG. 6, trajectory coordination component 320 performs trajectory coordination for first output component controller 604A and second output component controller 604B. In this example, first output component controller 604A (e.g., which includes one or more of the features of 340 of FIG. 3A) controls output component 606A (e.g., which includes one or more of the features of 350 of FIG. 3A). In this example, second output component controller 604B (e.g., which includes one or more of the features of 340 of FIG. 3A) controls output component 606B (e.g., which includes one or more of the features of 350 of FIG. 3A).

At 610, trajectory coordination component 320 receives input. In some embodiments, the input includes user input. In some embodiments, the input includes state data from one or more other components. For example, in FIG. 6, output component 606A provides state data to first output component controller 604A at 612B, and first output component controller 604A provides state data (e.g., the same and/or different than received at 612B) to trajectory coordination component 320 at 612A. In this example, second output component controller 604B and output component 606B also provide state data to trajectory coordination component 320. For example, in FIG. 6, output component 606B provides state data to second output component controller 604B at 614B, and second output component controller 604B provides state data (e.g., the same and/or different than received at 612B) to trajectory coordination component 320 at 614A.

In some embodiments, user input includes one or more of: a tap input and/or a non-tap input. In some embodiments, user input includes one or more of: verbal input, an audible request, an audible command, an audible statement, a swipe input, a hold-and-drag input, a gaze input, an air gesture, rotation of a steering mechanism, and/or a mouse click. In some embodiments, user input includes one or more of: non-user input (e.g., data input received from another component, electronic device, and/or process that is not triggered by user input) (e.g., sensor, weather, user proximity, and/or user trip information (e.g., arriving at home or departing from home)).

In some embodiments, input includes data input (e.g., received data such as media, audio, video, policies, preferences, and/or environmental data), event data (e.g., an event generated by a processor, component, logic, and/or software of the electronic device), feedback data (e.g., a context, such as an environmental context, a subject context of a subject in an environment, and/or an operational context of a component) (e.g., data regarding an operational state of a component in communication with the electronic device, such as location, position, velocity, acceleration, and/or other status (e.g., open, closed, moving, obstructed, error, and/or communication status)), sensor data (e.g., data received from a sensor) (e.g., position, velocity, acceleration, force, visual, and/or audio) (e.g., of the electronic device, of a subject, and/or of a different electronic device (e.g., a wearable device, a companion device of the electronic device, an electronic device of the subject, and/or another type of electronic device)), and/or memory data input (e.g., data received and/or retrieved from memory). In some embodiments, data input includes weather data input (e.g., input regarding the current and/or forecasted weather at the current location, at another location, and/or along a route), proximity data input (e.g., proximity to a subject (e.g., user, person, and/or object)), and/or electronic device data input (e.g., data representing operations, settings, instructions, states, and/or communications from, and/or of, the electronic device and/or one or more other electronic devices).

In some embodiments, input includes (and/or is detected in conjunction with) an indication (e.g., a command, a request, an instruction, an event, a trigger, and/or a condition occurring) that a coordinated set of output trajectories should be executed, generated, and/or output.

In some embodiments, trajectory coordination component 320 determines a set of (e.g., one or more) coordinated output trajectories in response to detecting the input (e.g., one or more inputs). In some embodiments, trajectory coordination component 320 detects (and/or retrieves) one or more other inputs, in response to detecting a first input (e.g., user input). For example, the first input causes trajectory coordination component 320 to detect (and/or otherwise read, determine, and/or receive) input from one or more components (e.g., a sensor, a device, memory, and/or a controller). In some embodiments, trajectory coordination component 320 determines the set of coordinated output trajectories in conjunction with (e.g., after and/or in response to) receiving (e.g., detecting) the input at 610.

At 620, trajectory coordination component 320 determines (e.g., calculates, retrieves, generates, and/or derives) a set of one or more trajectories and a set of one or more target execution times for output component 606A and output component 606B. For example, trajectory coordination component 320 determines a first output trajectory for first output component controller 604A and a second output trajectory for second output component controller 604B. In some embodiments, the set of one or more target execution times are coordinated (e.g., generated so that output of separate output components occurs simultaneously, serially, and/or with respect a common clock). In some embodiments, determining the set of one or more trajectories includes determining (e.g., selecting and/or using) an applicable trajectory policy. For example, the first and second output trajectories can be generated to satisfy and/or based on rules in a trajectory policy that applies to the current operating states of the first and second output components (e.g., and/or other data relevant to determining a trajectory policy).

In some embodiments, trajectory coordination component 320 determines a respective output trajectory (e.g., forming the set of two or more coordinated output trajectories) for output components (e.g., a trajectory for each output component) in a set of two or more output components. For example, trajectory coordination component 320 can generate additional output trajectories for other output components that are part of the same scene as the example in FIG. 6.

In some embodiments, generating an output trajectory includes blending and/or merging predefined animations (e.g., jerk-limited, Bezier curves, preset, manual motion, and/or acceleration limited) to form a blended output trajectory (e.g., the first output trajectory for first output component controller 604A, the second output trajectory for second output component controller 604B, and/or a different output trajectory).

In some embodiments, output trajectories coordinate output of one or more output components of the following: one or more display generation components (e.g., displays, screens, and/or projectors), one or more audio output components (e.g., speakers and/or amplifiers), one or more movement components (e.g., motors, linkages, and/or movable components that resist and/or absorb applied energy), one or more light output components (e.g., light controllers, light-emitting diodes (LEDs) and/or lightbulbs), and/or one or more opacity control components (e.g., for reducing and/or increasing light transmissivity of a medium). For example, first output component controller 604A and second output component controller 604B can both be movement components (e.g., of the same type or different types) that (e.g., appear to) move in coordination with each other. For example, first output component controller 604A can be a lighting component and second output component controller 604B can be a movement component such that lighting changes change in coordination with progress along a movement trajectory of second output component controller 604B.

In some embodiments, output components are controlled by different controllers. For example, output component 606A and output component 606B are controlled by separate controllers (e.g., first output component controller 604A and second output component controller 604B, respectively). In some embodiments, output components are controlled by the same controller (e.g., first output component controller 604A).

At 622A, trajectory coordination component 320 provides (e.g., transmits, passes, and/or sends) the first output trajectory to (and/or for) first output component controller 604A (e.g., via a system controller of the electronic device). At

622B, trajectory coordination component 320 provides the second output trajectory to second output component controller 604B. In some embodiments, transmitting an output trajectory (e.g., the first and/or the second output trajectory) includes transmitting the output trajectory via one or more communication paths (e.g., one or more dedicated and/or non-dedicated data buses) (e.g., wireless and/or wired). In some embodiments, an output trajectory and a corresponding target execution time are provided (e.g., via 622A) to system controller 330, which then provides (e.g., via 622A) the first output trajectory and the first target execution time to the first physical output component (e.g., output component 606A). In some embodiments, trajectory coordination component 320 provides one or more other trajectories to one or more other output components in the set of one or more output components that have output trajectories coordinated with the first and/or second output trajectories.

In some embodiments, trajectory coordination component 320 (e.g., and/or a UI component that includes trajectory coordination component 320) and the output component controllers (e.g., first output component controller 604A and second output component controller 604B) (e.g., and/or a body controller that includes each or both) are time coordinated (e.g., via 802.1AS). For example, trajectory coordination component 320 can perform one or more time coordination operations directed to (e.g., for the purpose of, that results in, and/or that enables the other devices to perform) coordinating output trajectory execution (e.g., performance of and/or output of output trajectories by physical output components) (e.g., coordination between one or more output components (e.g., the first output component and/or the second output component) and/or between an output component and trajectory coordination component 320). In some embodiments, the one or more time coordination operations include operations as specified in, supported by, comporting to, compatible with, and/or for implementing the protocols in accordance with IEEE 802.1AS and/or any protocol for coordinating (e.g., synchronizing) timing over a network (e.g., local area network and/or wide area network). In some embodiments, the one or more time coordination operations includes coordinating with one or more physical output component controller for respective physical output components that correspond to a respective output trajectory of the set of two or more coordinated output trajectories. In some embodiments, the one or more time coordination operations includes coordinating with a first physical output component controller for the first physical output component. In some embodiments, the one or more time coordination operations includes coordinating with a second physical output component controller (e.g., same as or different from the first physical output component controller) for the second physical output component.

In some embodiments, trajectory coordination component 320 (e.g., and/or a UI component that includes trajectory coordination component 320) and the output component controllers (e.g., first output component controller 604A and second output component controller 604B) (e.g., and/or a body controller that includes each or both) are connected via one or more networks that includes one or more of ethernet-based communication and controller area network (CAN)-based communication. In some embodiments, trajectory coordination component 320 provides a second output trajectory and a second target execution time via (e.g., 622B) a second network (e.g., the same or different from a first network used to provide (e.g., via 622A) a first output trajectory) that includes one or more of ethernet-based communication and controller area network (CAN)-based communication. In some embodiments, ethernet-based communication is performed using operations as specified in, supported by, comporting to, compatible with, and/or for implementing the Ethernet protocols in accordance with IEEE 802.3. In some embodiments, CAN-based communication is performed using operations as specified in, supported by, comporting to, compatible with, and/or for implementing the CAN protocols in accordance with ISO 11898.

At 630A, first output component controller 604A optionally decodes the first output trajectory. At 630B, second output component controller 604B optionally decodes the second output trajectory. In some embodiments, a system controller (e.g., 330 of FIG. 3A) decodes (using decoder component 330A of FIG. 3A) one or more of the trajectories for the set of one or more output components. In some embodiments, the one or more trajectories are decoded before being received by first output component controller 604A and/or second output component controller 604B. For example, 622A and/or 622B can include an intermediate operation of decoding the respective first and second output trajectories so that first output component controller 604A and second output component controller 604B receive respective decoded versions of these trajectories.

In some embodiments, decoding the output trajectory (e.g., into a decoded output trajectory) includes converting the output trajectory into data that can be used by (e.g., read by, parsed by, understood by and/or applied by) the physical output component controller and/or the movement component. In some embodiments, a decoded output trajectory includes a set of one or more positions, settings, values, locations, states, locations, and/or target execution times (e.g., that together define a path over time of an output according to the output trajectory).

At 640A, first output component controller 604A checks state data and/or a set of one or more criteria to determine whether output according to the received first output trajectory can be performed. For example, first output component controller 604A can determine that the first output trajectory is within the capabilities of output component 606A and/or whether an error condition is occurring and/or is expected to occur (e.g., where an obstruction is present in a path of the first output trajectory). At 640B, second output component controller 604B checks state data and/or a set of one or more criteria (e.g., the same or different than criteria used by first output component controller 604A) to determine whether output according to the received second output trajectory can be performed. For example, second output component controller 604B can determine that the second output trajectory is within the capabilities of output component 606B and/or whether an error condition is occurring and/or is expected to occur (e.g., where an obstruction is present in a path of the second output trajectory). In some embodiments, in response to detecting an error condition (and/or another reason for not being able to cause output according to the respective output trajectory), first output component controller 604A transmits an indication of the error condition to trajectory coordination component 320 (e.g., as described below with respect to 662A). In some embodiments, in response to detecting an error condition (and/or another reason for not being able to cause output according to the respective output trajectory), first output component controller 604A transmits an indication of the error condition to trajectory coordination component 320 (e.g., as described below with respect to 662B).

In some embodiments, an output trajectory includes one or more movement characteristics (e.g., velocity, acceleration, position, position goal (e.g., intermediate and/or end location), range of motion, and/or movement mode) for a set of one or more movement components. For example, first output component controller 604A and/or second output component controller 604B can check to determine that movement according to the movement characteristics is allowable (e.g., given operating windows and/or capability constraints).

In some embodiments, after receiving an output trajectory (e.g., in response to and/or in conjunction with) (and/or during performance and/or execution of the output trajectory): in accordance with a determination (e.g., made by first output component controller 604A and/or second output component controller 604B) that a first set of one or more criteria is satisfied (e.g., with respect to and/or by the output trajectory and/or a portion thereof) (e.g., criteria indicating that movement according to the output trajectory can be performed in a manner that satisfies a set of conditions and/or in a manner that will not (and/or is not expected to) cause an error condition), an output component controller (e.g., first output component controller 604A and/or second output component controller 604B) causes movement of a movement component (e.g., output component 606A and/or output component 606B) according to (e.g., that matches, attempts to match, and/or is a best effort attempt to match) the movement characteristics of the output trajectory.

In some embodiments, after receiving an output trajectory: in accordance with a determination (e.g., made by first output component controller 604A and/or second output component controller 604B) that a second set of one or more criteria is satisfied (e.g., with respect to and/or by the output trajectory and/or a portion thereof) (e.g., criteria indicating that movement according to the output trajectory cannot be performed in a manner that satisfies first set of one or more criteria) (e.g., different from the first set of one or more criteria), an output controller (e.g., first output component controller 604A and/or second output component controller 604B) forgoes causing movement of the movement component according to the plurality of movement characteristics of the output trajectory. In some embodiments, the second set of one or more criteria is satisfied when the first set of one or more criteria is not satisfied.

In some embodiments, the first set of one or more criteria includes a criterion that is satisfied in accordance with a determination that movement of the movement component according to the plurality of movement characteristics can be performed in a in a manner that satisfies a set of conditions and/or in a manner that will not (and/or is not expected to) cause an error condition. In some embodiments, movement in a manner that will not cause an error condition includes one or more of: movement that will not cause a collision (e.g., no obstructions are currently detected and/or expected), movement that is within an operating window of a movement component (e.g., is within a supported range of motion, is at a supported velocity, and/or uses (and/or is expected to use) a supported amount of force and/or power to move) and/or movement that is compatible with a current context (e.g., environmental context of the environment and/or operation context of the movement component).

In some embodiments, the first set of one or more criteria includes a criterion that is satisfied in accordance with a determination that the movement component is capable (e.g., mechanically capable and/or electronically capable) of performing movement according to the plurality of movement characteristics (e.g., movement according to the plurality of movement characteristics requires one or more movements that are supported by and/or able to be performed by the movement component). In some embodiments, the movement component is capable of performing movement according to the plurality of movement characteristics if such movement that is within an operating window of a movement component (e.g., is within a supported range of motion, is at a supported velocity, and/or uses (and/or is expected to use) a supported amount of force and/or power to move).

At 650A, first output component controller 604A optionally determines whether any updates (e.g., modifications, alternatives, changes, and/or ignoring) to the first output trajectory are needed. For example, the first output trajectory can be changed if first output component controller 604A determines that updates are needed based on one or more determinations (e.g., application of one or more criteria) (e.g., at 640A) with respect to state data (e.g., 654A) corresponding to output component 606A. At 650B, second output component controller 604B determines whether any updates (e.g., modifications, alternatives, changes, and/or ignoring) to the second output trajectory are needed. For example, the second output trajectory can be changed if second output component controller 604B determines that updates are needed based on one or more determinations (e.g., application of one or more criteria) (e.g., at 640B) with respect to state data (e.g., 654B) corresponding to output component 606B. In some embodiments, the operations at 650A and/or 650B are performed in response to detecting an error condition (e.g., after receiving state data and/or monitoring output (e.g., at 660A and/or 66B)).

In some embodiments, after receiving an output trajectory and in accordance with the determination that the second set of one or more criteria is satisfied: an output component controller (e.g., first output component controller 604A and/or second output component controller 604B) modifies the output trajectory to create a modified output trajectory (e.g., different from the output trajectory). In some embodiments, the modified output trajectory includes a modified plurality of movement characteristics different from the plurality of movement characteristics of the output trajectory (e.g., output component 606A and/or output component 606B). In some embodiments, the modified output trajectory is a new trajectory (e.g., not based on the trajectory received at 622A). In some embodiments, the output component controller modifies the output trajectory to create the modified output trajectory after beginning, while performing, and/or while pausing performing movement according to the output trajectory (e.g., modify the output trajectory after and/or while causing movement along the output trajectory). For example, the modified output trajectory can satisfy an applicable trajectory policy, and be used instead of the output trajectory (received from trajectory coordination component 320) to cause movement of the output component.

In some embodiments, after receiving the output trajectory and in accordance with a determination that the second set of one or more criteria is satisfied, trajectory coordination component 320 causes movement of the movement component (e.g., output component 606A and/or 606B) according to a different timing (e.g., execution time) than a timing that corresponds to the output trajectory (e.g., moves slower or faster, begins at a different time, and/or ends at a different time) (e.g., the modified trajectory includes, is accompanied by, and/or is defined by modified target execution times). In some embodiments, after receiving the output trajectory and in accordance with a determination that the second set of one or more criteria is satisfied, trajectory coordination component 320 causes no movement of the movement component (e.g., forgoes causing movement of the movement component).

In some embodiments, an output component controller (e.g., first output component controller 604A and/or second output component controller 604B) performs output according to a corresponding output trajectory when a trajectory coordination component is not reachable (e.g., is offline, is not responding (e.g., unintentionally and/or intentionally) (e.g., due to network issues, high bandwidth usage, network congestion and/or collision, high processor usage, physical connectivity issues, interference), and/or is no longer connected (e.g., connection lost and/or terminated) by the output component controller. For example, first output component controller 604A can proceed with performing the first output trajectory (e.g., received via 622A) (and/or a modified output trajectory) in response to detecting an error condition.

In some embodiments, an output component controller (e.g., first output component controller 604A and/or second output component controller 604B) detects a safety condition (e.g., a collision and/or a pinch) and performs a responsive maneuver without (e.g., or before) communicating with trajectory coordination component 320. In some embodiments, the second set of one or more criteria includes a criterion that is satisfied in accordance with a determination that an error condition (e.g., condition (e.g., state, flag, event, and/or warning) that indicates that a potentially unsafe condition has occurred, is occurring, will occur, and/or is likely to occur) exists (e.g., is currently detected and/or is expected to occur based on performing a current and/or prospective output trajectory). In some embodiments, after receiving the output trajectory and in accordance with the determination that the second set of one or more criteria is satisfied: the output component controller determines a responsive output trajectory (e.g., responsive to the error condition) (e.g., a modified output trajectory) different from the output trajectory without communicating with (e.g., without exchanging (e.g., receiving and/or transmitting) a message, an instruction, and/or other data) trajectory coordination component 320.

In some embodiments, the responsive output trajectory causes (and/or otherwise allows) the first set of one or more criteria to be satisfied (e.g., the responsive output trajectory satisfies the first set of one or more criteria). In some embodiments, the output component controller causes the movement of the movement component according to movement characteristics of the responsive output trajectory.

At 652A, first output component controller 604A provides control signals to output component 606A to cause output according to the first output trajectory (e.g., if the first output trajectory satisfied applicable checks and/or criteria). For example, first output component controller 604A can apply motor control signals to output component 606A to cause movement according to the first output trajectory and/or apply light level controls to a circuit of a light output component to cause light output in accordance with the first output trajectory. At 652B, second output component controller 604B provides control signals to output component 606B to cause output according to the second output trajectory (e.g., if the second output trajectory satisfied applicable checks and/or criteria). For example, second output component controller 604B can apply motor control signals to output component 606B to cause movement according to the second output trajectory and/or apply light level controls to a circuit of a light output component to cause light output in accordance with the second output trajectory. In some embodiments, first output component controller 604A and/or second output component controller 604B perform their respective trajectories at a time offset (e.g., future time based on a target execution time).

At 654A, first output component controller 604A receives state data from output component 606A. In some embodiments, the state data includes status information corresponding to output component 606A (and/or one or more corresponding components, such as sensor monitoring output component 606A). At 654B, second output component controller 604B receives state data from output component 606B. In some embodiments, the state data includes status information corresponding to output component 606B (and/or one or more corresponding components, such as sensor monitoring output component 606B).

At 660A, first output component controller 604A monitors output of output component 606A (e.g., using state data received at 654A). In some embodiments, first output component controller 604A (and/or trajectory coordination component 320) can use the state data to track trajectory, detect errors, and/or allocate resources (e.g., based on knowing when a component is busy and/or free). At 660B, second output component controller 604B monitors output of output component 606B (e.g., using state data received at 654B. In some embodiments, second output component controller 604B (and/or trajectory coordination component 320) can use the state data to track trajectory, detect errors, and/or allocate resources (e.g., based on knowing when a component is busy and/or free).

In some embodiments, tracking trajectory includes tracking progress of an output component with respect to an output trajectory (e.g., comparing actual position to intended position at a particular time according to a movement trajectory being performed by a movement component). In some embodiments, detecting an error condition includes detecting that the progress of the output component does not match (e.g., satisfy and/or follow) (e.g., within a threshold tolerance) the output trajectory. In some embodiments, the tracking is performed while output according to the corresponding output trajectory is occurring. In some embodiments, the tracking is performed over time (e.g., at regular intervals, irregular intervals, and/or on demand (e.g., in response to an ad hoc request)).

In some embodiments, first output component controller 604A (e.g., at 660A) and/or second output component controller 604B (e.g., at 660B) detect one or more error condition (e.g., corresponding to the respective output components controlled by each) and provide an indication of the error condition to trajectory coordination component 320. At 662A, first output component controller 604A provides, to trajectory coordination component 320, an indication of an error condition (e.g., detected at 660A) corresponding to the output component 606A. At 662B, second output component controller 604B provides, to trajectory coordination component 320, an indication of an error condition (e.g., detected at 660B) corresponding to the output component 606B.

At 670, trajectory coordination component 320 determines that an update to the set of one or more trajectories is needed (e.g., including generating one or more modified trajectories). In some embodiments, a determination that an update is needed is based on state data received from one or more output components (e.g., at 662A and/or 662B). For example, trajectory coordination component 320 determines (at 670) updates to the first and second output trajectories in response to determining that an error condition exists at output component 606A (e.g., and that output component

606A needs a new output trajectory to compensate for the error and output component 606B needs a new output trajectory to maintain coordination with output component 606A). In some embodiments, trajectory coordination component 320 determines a modified trajectory for output component 606A (e.g., and output component 606B) based on feedback (e.g., an error or status) of output component 606B. In some embodiments, trajectory coordination component 320 determines a modified trajectory for output component 606B (e.g., and/or output component 606A) based on feedback (e.g., an error or status) of output component 606A. For example, if output component 606A is performing movement too slowly, trajectory coordination component 320 can update the trajectory of output component 606B to slow down movement of output component 606B to match the movement speed of output component 606A (e.g., so that output component 606A and output component 606B appear to move in coordination).

At 672A, trajectory coordination component 320 provides (e.g., transmits, passes, and/or sends) a modified first output trajectory to (and/or for) first output component controller 604A (e.g., via a system controller of the electronic device) (e.g., similar to as described with respect to 622A). At 672B, trajectory coordination component 320 provides a modified second output trajectory to second output component controller 604B (e.g., similar to as described with respect to 622B).

In some embodiments, an output component controller (e.g., first output component controller 604A and/or second output component controller 604B) receives a modified trajectory and begins to perform output based on the updated trajectory. In some embodiments, the modified trajectory is received while a prior output trajectory is still being performed. For example, while output component 606B is performing movement, second output component controller 604B receives a modified trajectory configured to cause output component 606B to slow down to match output component 606A. In some embodiments, subject to the same checks described above (e.g., with respect to 640A and/or 640B) the output component controller changes output based on (e.g., to match) the modified trajectory. In some embodiments, changing the output includes overriding current trajectory (e.g., replacing in whole). In some embodiments, changing the output includes or blending the modified trajectory with the current trajectory (e.g., to smoothly transition between them).

Figure 7A:
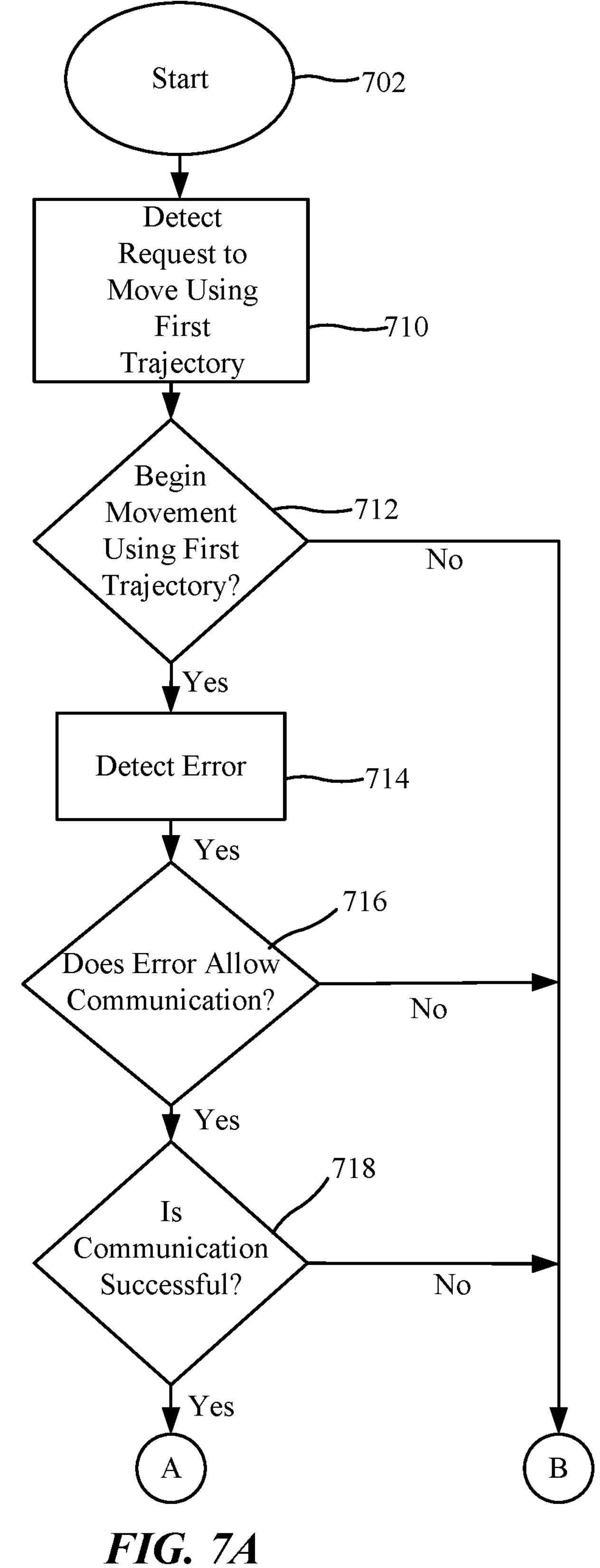
FIGS. 7A-7B are a flow diagram illustrating a method for controlling output components in accordance with some embodiments.
Figure 7B:
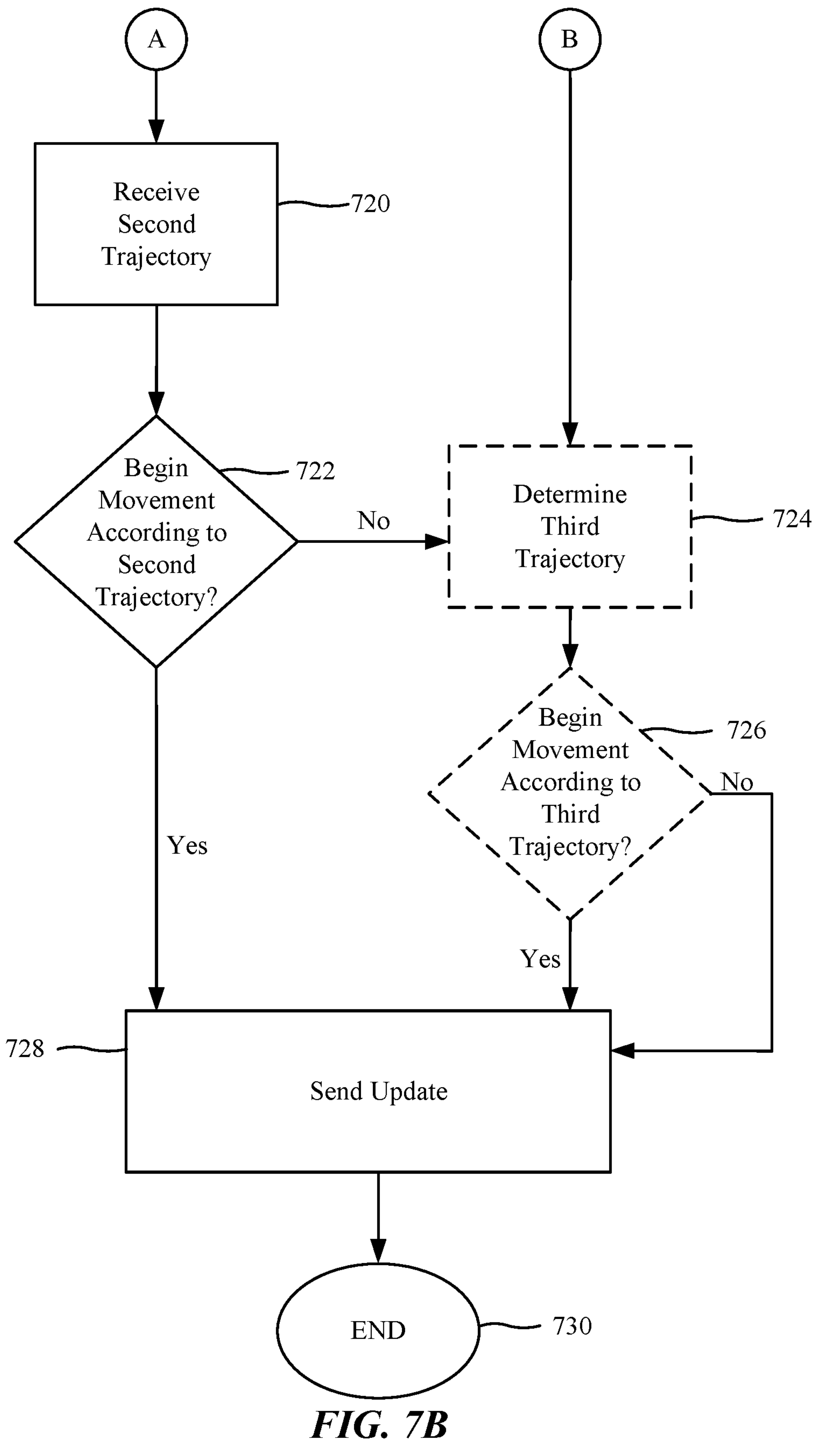

FIGS. 7A-7B illustrate a flow diagram of exemplary process 700 for using a substitute (e.g., alternative and/or responsive) trajectory in the event of an error condition, in accordance with some embodiments. In some embodiments, process 700 is performed by one or more components of an electronic device. In this example, process 700 is performed by output component controller (e.g., 340 of FIG. 3A) (e.g., of compute system 100 and/or device 200).

At 702, process 700 starts. At 710, output component controller 340 detects a request to move an output component (e.g., 350 of FIG. 3A) according to a first trajectory. For example, the first trajectory includes data for causing and/or that requires movement (e.g., a trajectory as described above, such as 510, 550, and/or 560). In some embodiments, the request includes the first trajectory. In some embodiments, the request is received from one or more of trajectory coordination component 320 and/or system controller 330 (e.g., decoder component 330A). In some embodiments, the request is input (e.g., user input and/or input received from one or more other components and/or devices). In some embodiments, the input includes data (e.g., environmental data, contextual data, feedback data, and/or sensor data) (e.g., weather, user proximity, and/or trip information). At 710, process 700 moves on to 712.

At 712, output component controller 340 determines whether to begin (e.g., cause) movement using (e.g., according to) the first trajectory. For example, output component controller 340 can perform one or more checks (e.g., according to one or more sets of one or more criteria) to determine whether the first trajectory can and/or should be performed. Such checks can include whether an error condition currently exists (and/or is likely to be created by the first trajectory), whether the corresponding output component is available and/or capable of the first movement, and/or whether a current context (e.g., of the output component and/or output component controller 340) allows movement according to the first trajectory. At 712, if output component controller 340 determines not to begin (e.g., determines to forgo) movement according to the first trajectory, process 700 moves on to 724 (described in more detail below). At 712, if output component controller 340 determines to begin movement according to the first trajectory, process 700 moves on to 714.

At 714, output component controller 340 detects an error condition corresponding to the first trajectory (and/or corresponding to the output component that prevents the first trajectory from being performed in a manner that meets all applicable criteria (e.g., for operating and/or moving the output component)). In some embodiments, movement according of the first trajectory of the output component is ongoing when the error is detected (e.g., the movement component is currently moving). In some embodiments, the error is detected before movement actually begins. In some embodiments, output component controller 340 does not detect an error condition and, optionally, moves on to another operation for beginning movement according to the first trajectory.

In some embodiments, the error condition is detected using trajectory tracking (e.g., comparing actual position of the output component to intended position of the output component at a particular time according to a trajectory for the physical object). In some embodiments, the electronic device (e.g., output component controller 340) outputs (and/or causes to be output) an indication of the error condition (e.g., a perceptible indication, such as a chime and/or light output).

In some embodiments, output component controller 340 performs one or more operations in response to detecting the error. For example, while movement is occurring, time and/or physical resources may limit ability to communicate with trajectory coordination component 320 (e.g., to determine an appropriate response to the error condition). At 714, process 700 moves on to 716.

At 716, output component controller 340 determines whether the error condition (and/or characteristics thereof) allows communication (e.g., with trajectory coordination component 320). For example, if the error condition is detected to have one or more characteristics and/or is detected to be a type of error condition that is urgent, output component controller 340 can proceed with taking a responsive action without communicating beforehand with the trajectory coordination component 320 (e.g., not relying on and/or waiting for an updated trajectory from the trajectory coordination component 320). At 716, if output component controller 340 determines that the error does not allow communication (e.g., is urgent), process 700 moves on to 724 (described in more detail below). In some embodiments, output component controller 340 determines there is not enough time before an event corresponding to the error condition (e.g., a collision with a subject) to communicate with trajectory coordination component 320 (e.g., so no communication is sent to trajectory coordination component 320, such as a request for an updated trajectory, before output component controller 340 takes action by changing output trajectory in response to the error condition). At 716, if output component controller 340 determines that the error condition allows communication, process 700 moves on to 718.

At 718, output component controller 340 determines if communication (e.g., with trajectory coordination component 320) is successful. For example, output component controller 340 sent a communication to trajectory coordination component 320 and output component controller 340 determines whether a timely response (e.g., that is valid and within a timeout period) is received. In some embodiments, output component controller 340 sends a communication (e.g., a request and/or a message) to trajectory coordination component 320 (e.g., indicating that the error condition exists and/or describing one or more sets of data that indicate (e.g., can be used to determine the existence of) the error condition). In some embodiments, communication is successful if a response is received from trajectory coordination component 320 before a timeout period expires. In some embodiments, communication is successful if a new (e.g., updated) trajectory is received from trajectory coordination component 320. In some embodiments, trajectory coordination component 320 determines that communication is not successful if output component controller 340 does not receive a timely response. For example, communication is not successful if trajectory coordination component 320 does not respond (e.g., because trajectory coordination component 320 is overloaded or offline, connection bus is busy, and/or response not received in time before the event corresponding to the error condition). In some embodiments, a response is received within the timeout period but is ignored (e.g., is not used and/or considered valid and/or timely). For example, the error condition may have been updated and changed in nature and/or urgency so that output component controller 340 has taken (or will take) action without regard to the response. At 718, if output component controller 340 determines that communication is not successful, process 700 moves on to 724 (described in more detail below). At 718, if output component controller 340 determines that communication is successful, process 700 moves on to 720.

At 720, output component controller 340 receives a second trajectory (e.g., from trajectory coordination component 320). For example, communication with trajectory coordination component 320 is successful and output component controller 340 receives a second trajectory (e.g., to replace the first trajectory). In some embodiments, the second trajectory is provided for responding to the error condition. For example, the second trajectory is determined based on the error condition, to relieve the error condition, to mitigate the error condition, to negate the error condition, to resolve the error condition, and/or to avoid the error condition. At 720, process 700 moves on to 722.

In some embodiments, a trajectory for responding to the error condition (e.g., the second trajectory) is a predetermined trajectory (e.g., selected from one or more predetermined trajectories such as, for example, for responding to the type of error condition and/or characteristics of the error conditions). In some embodiments, a trajectory for responding to the error condition (e.g., the second trajectory) depends on a current trajectory (e.g., the first trajectory) and/or current state data (e.g., position and/or motion information of the output component). For example, the response to the error condition can be a trajectory that alters movement to avoid a detected obstacle. In some embodiments, a trajectory for responding to the error condition (e.g., the second trajectory) is reversal of a current trajectory. For example, the output component can progress through the current trajectory backwards (e.g., rewind the current trajectory to return to an initial location). In some embodiments, reversal is only partial (e.g., only part of the current trajectory is performed in reverse).

At 722, output component controller 340 determines whether to begin (e.g., cause) movement using (e.g., according to) the second trajectory. For example, output component controller 340 can perform one or more checks (e.g., according to one or more sets of one or more criteria) to determine whether the second trajectory can and/or should be performed. Such check can include whether an error condition currently exists (and/or is likely to be created by the second trajectory), whether the corresponding output component is available and/or capable of the movement according to the second trajectory, and/or whether a current context (e.g., of the output component and/or output component controller 340) allows movement according to the second trajectory. At 722, if output component controller 340 determines not to begin movement according to the second trajectory, process 700 moves on to 724. For example, output component controller 340 can receive the second trajectory from the trajectory coordination component 320, but ignore the second trajectory for some reason (e.g., output component controller 340 performs movement to respond to the error condition without using the second trajectory). At 722, if output component controller 340 determines to begin movement according to the second trajectory, process 700 moves on to 728 (described in more detail below).

At 724, output component controller 340 optionally determines a third trajectory (e.g., different from the first trajectory and/or from the second trajectory). For example, at 724, the error condition does not allow for communication (e.g., No at 716), communication is not successful (e.g., No at 718), and/or output component controller 340 determines not to begin movement according to the second trajectory (e.g., No at 722). In any of the aforementioned scenarios for ending up at 724, output component controller 340 is left without a replacement for the first trajectory (e.g., which is still subject to the error condition). In this example, output component controller 340 determines a third trajectory for responding to the error condition. In some embodiments, the third trajectory is determined based on current state data corresponding to the output component. At 724, process 700 moves on to 726.

At 726, output component controller 340 optionally determines whether to begin (e.g., cause) movement using (e.g., according to) the third trajectory. For example, output component controller 340 can perform one or more checks (e.g., according to one or more sets of one or more criteria) to determine whether the third trajectory can and/or should be performed. Such check can include whether an error condition currently exists (and/or is likely to be created by the third trajectory), whether the corresponding output component is available and/or capable of the movement according to the third trajectory, and/or whether a current context (e.g., of the output component and/or output component controller 340) allows movement according to the third trajectory. At 726, if output component controller 340 determines not to begin movement according to the third trajectory, process

700 moves on to 728. At 726, if output component controller 340 determines to begin movement according to the third trajectory, process 700 moves on to 728. In some embodiments, output component controller 340 does not determine whether to begin (e.g., does not perform checks on the third trajectory) (e.g., because output component controller 340 generated the third trajectory, it can consider any checks and/or criteria at that point (e.g., at 724)).

At 728, output component controller 340 sends an update to trajectory coordination component 320. In some embodiments, the update includes recent (e.g., the most recent and/or current) state data (e.g., corresponding to output component controller 340 and/or the corresponding output component). For example, the update provided to the trajectory coordination component 320 can include normal feedback (e.g., such as the currently position, velocity, and/or acceleration of a movement component). For example, the update provided to the trajectory coordination component 320 can include an indication and/or representation of the third trajectory (e.g., that was determined by output component controller 340). Providing the third trajectory to trajectory coordination component 320 can allow the trajectory coordination component 320 to adjust (e.g., for coordination purposes) one or more other trajectories (e.g., of other output component controllers and/or output components).

At 728, process 700 moves on to 730 and ends.

Figure 8:
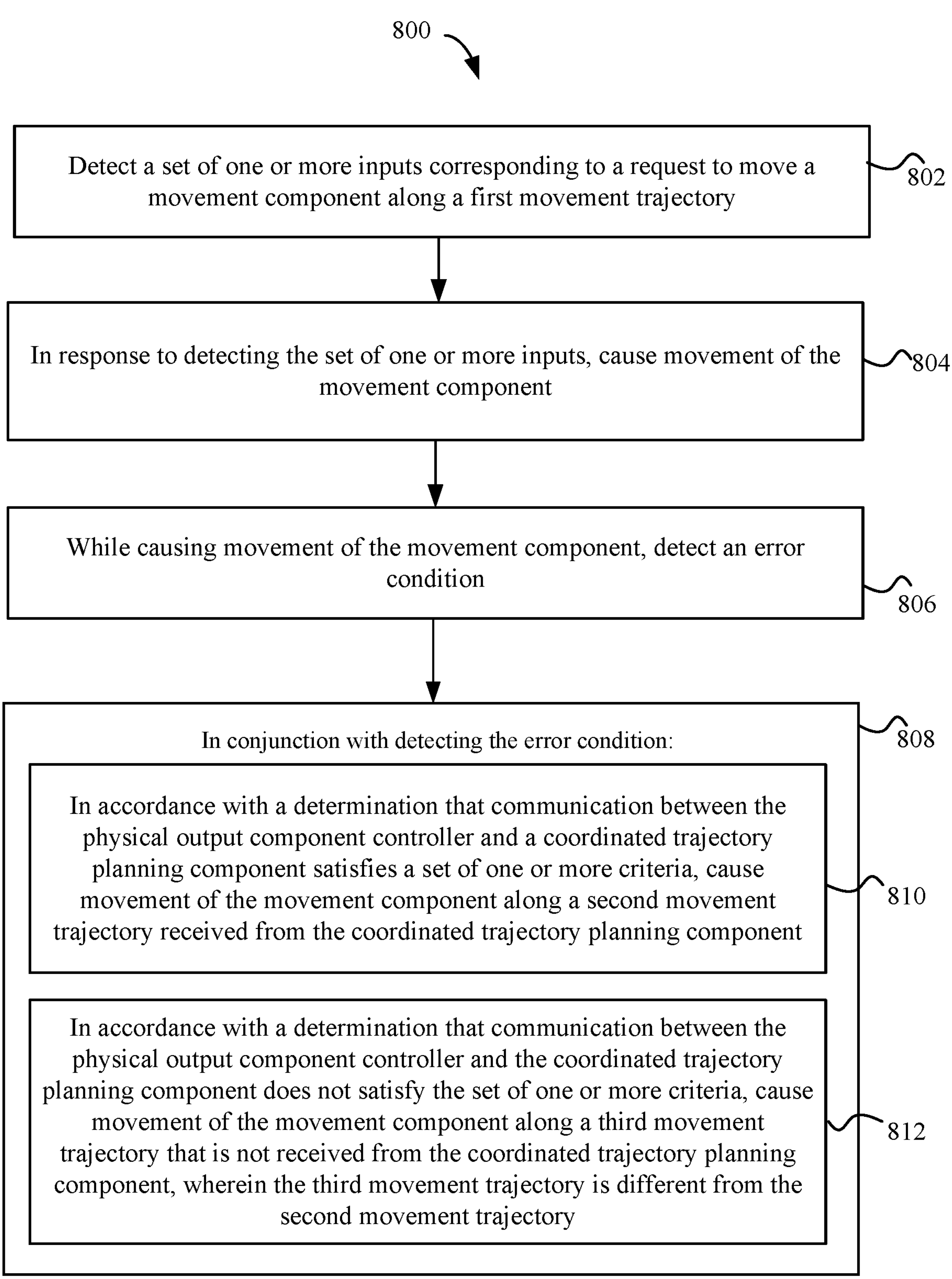
FIG. 8 is a flow diagram illustrating a method for controlling output components in accordance with some embodiments.

FIG. 8 is a flow diagram illustrating a method for coordinating and controlling output components using an electronic device in accordance with some embodiments. Method 800 is performed at an electronic device (e.g., 100 and/or 200). Some operations in method 800 are, optionally, combined, the orders of some operations are, optionally, changed, and some operations are, optionally, omitted.

As described below, method 800 provides an intuitive way for coordinating and controlling output components. The method reduces the cognitive burden on a user for coordinating and controlling output components, thereby creating a more efficient human-machine interface. For battery operated computing devices, enabling a user to coordinate and control output components faster and more efficiently conserves power and increases the time between battery charges.

In some embodiments, method 800 is performed at a physical output component controller (e.g., 340, 604A, and/or 604B) of an electronic device (e.g., 100, 200, and/or 300) (e.g., a watch, a phone, a tablet, a fitness tracking device, a processor, a head-mounted display (HMD) device, a communal device, a media device, a motorized electronic device, a wearable electronic device, an autonomous and/or semi-autonomous electronic device, a speaker, a television, and/or a personal computing device). In some embodiments, the electronic device is in communication with one or more input devices (e.g., a communications receiving component, a camera, a depth sensor, a microphone, a hardware input mechanism, a rotatable input mechanism, a heart monitor, a temperature sensor, and/or a touch-sensitive surface) and/or one or more output devices (e.g., a communications transmission component, a light output component, a movement component, a display generation component, an audio generation component, a speaker, a haptic output device, a display screen, a projector, and/or a touch-sensitive display).

The physical output component controller detects (802) (e.g., via the one or more input devices) (e.g., 710) a set of one or more inputs corresponding to a request to move a movement component (e.g., 350, 350A, 350B, **350*n*, 606A, and/or 606B) along a first movement trajectory (e.g., 510) (e.g., a path over a time constraint). In some embodiments, the set of one or more inputs includes user input (e.g., a tap input and/or a non-tap input (e.g., a verbal input, an audible request, an audible command, an audible statement, a swipe input, a hold-and-drag input, a gaze input, an air gesture, rotation of a steering mechanism, and/or a mouse click)). In some embodiments, the set of one or more inputs includes data input (e.g., media, audio, video, policies, preferences, and/or environmental data), feedback data (e.g., a context, such as an environmental context, a subject context of a subject in an environment, and/or an operational context of a component), and/or sensor data (e.g., position, velocity, acceleration, force, visual, and/or audio) (e.g., of the electronic device (e.g., 100 and/or 200**), of a subject, and/or of a different electronic device (e.g., a wearable device, a companion device of the electronic device, an electronic device of the subject, and/or another type of electronic device)). In some embodiments, the set of one or more inputs includes (and/or is detected in conjunction with) an indication (e.g., a command, a request, an instruction, a trigger, and/or a condition occurring) that a coordinated set of output trajectories should be executed, generated, and/or output.

In response to detecting the set of one or more inputs, the physical output component controller causes (804) (e.g., via the one or more output devices) movement (e.g., 712) of the movement component (e.g., 350, 350A, 350B, 606A, and/or 606B) (e.g., performs (and/or providing a best attempt to perform) the trajectory received from the coordinated trajectory planning component (e.g., 320 and/or 430)).

While causing movement of the movement component (e.g., 350, 350A, 350B, 606A, and/or 606B), the physical output component controller detects (806) (e.g., 714) (e.g., via the one or more input devices) an error condition (e.g., a safety condition and/or condition (e.g., state, flag, event, and/or warning) that indicates that an unsafe condition has occurred, is occurring, will occur, and/or is likely to occur) (e.g., an indication that an error corresponding to the movement is and/or has been detected) (e.g., a pinch and/or obstruction condition). In some embodiments, an error condition includes a collision condition (e.g., that a collision with a subject, an object, the environment, and/or another component of the electronic device (e.g., 100 and/or 200) will and/or is expected occur). In some embodiments, an error condition includes a pinch condition (e.g., that a collision with a subject will occur).

In conjunction with (808) (e.g., in response to, while, and/or after) detecting the error condition, in accordance with a determination that communication between the physical output component controller (e.g., 340, 604A, and/or 604B) and a coordinated trajectory planning component (e.g., 320 and/or 430) satisfies a set of one or more criteria (e.g., 716, 718, and/or 722) (e.g., satisfied when a determination is made that communication between the components can occur in a manner that satisfies a set of conditions (e.g., a manner that will not (and/or is not expected to) cause an error condition) (e.g., which can depend on the severity and/or urgency of the error condition)), the physical output component controller causes (810) (e.g., via the one or more output devices) movement of the movement component (e.g., 350, 350A, 350B, 606A, and/or 606B) (e.g., causes movement of one or more actuator and/or mechanical linkage) along a second movement trajectory (e.g., 510) received (e.g., 720) from the coordinated trajectory planning component (e.g., performs (and/or providing a best attempt to perform) the trajectory received from the coordinated trajectory planning component).

In conjunction with (808) detecting the error condition, in accordance with a determination that communication between the physical output component controller (e.g., 340, 604A, and/or 604B) and the coordinated trajectory planning component (e.g., 320 and/or 430) does not satisfy the set of one or more criteria, the physical output component controller causes (812) (e.g., via the one or more output devices) movement (e.g., 726) of the movement component (e.g., 350, 350A, 350B, 606A, and/or 606B) (e.g., causes movement of one or more actuator and/or mechanical linkage) along a third movement trajectory (e.g., 510) that is not received (e.g., after detection of the error condition) (e.g., is determined at 724) from the coordinated trajectory planning component (e.g., is determined by the physical output component controller) (e.g., the third movement trajectory is a substitute movement to relieve the pinch and/or obstruction condition), wherein the third movement trajectory is different from the second movement trajectory.

In some embodiments, the set of one or more criteria includes a criterion that: is satisfied in accordance with a determination that the physical output component controller (e.g., 340, 604A, and/or 604B) receives a timely response from the coordinated trajectory planning component (e.g., 320 and/or 430) (e.g., yes at 718). In some embodiments, a timely response is a response received by the physical output component controller (e.g., from the coordinated trajectory planning component) within a predetermined period of time. In some embodiments, the set of one or more criteria includes a criterion that: is not satisfied in accordance with a determination that the physical output component controller does not receive the timely response from the coordinated trajectory planning component (e.g., the coordinated trajectory planning component (e.g., or component implementing it) is overloaded and/or offline, connection bus is busy, and/or a response is not received in time (e.g., is not a timely response) (e.g., in enough time before a pinch and/or collision)).

In some embodiments, in accordance with a determination that a response is not received during a predetermined period of time (e.g., elapses, expires, and/or ends) (e.g., a timeout period) (e.g., no response is received at all or a response is received outside of (e.g., after) the predetermined period of time, and therefore not considered timely for at least that reason), the physical output component controller (e.g., 340, 604A, and/or 604B) does not receive the timely response from the coordinated trajectory planning component (e.g., 320 and/or 430) (e.g., no at 718). In some embodiments, the predetermined period of time begins in conjunction with detecting the error condition. In some embodiments, the predetermined period of time begins in conjunction with sending information (e.g., feedback, state information, and/or an indication of the error condition) to the coordinated trajectory planning component.

In some embodiments, the physical output component controller receives, from the coordinated trajectory planning component (e.g., 320 and/or 430), a response corresponding to the error condition (e.g., a response to an indication that the error condition has and/or is occurring, an indication of characteristics representing the error condition, and/or a communication requesting an updated trajectory (e.g., due to the error condition)) (e.g., the timely response and/or a response that is not timely (e.g., is received after the predetermined period of time)). In some embodiments, in response to receiving the response from the coordinated trajectory planning component, the physical output component controller ignores the response (e.g., no at 718 and/or 722). In some embodiments, the physical output component controller (e.g., 340, 604A, and/or 604B) ignores the response in accordance with a determination that the set of one or more criteria is not satisfied (e.g., does not satisfy the criterion of being a timely response). In some embodiments, the physical output component controller ignores the response in accordance with a determination that the response is not the timely response (e.g., is not received in a timely manner). In some embodiments, the physical output component controller ignores the response in accordance with a determination that the second movement trajectory received from the coordinated trajectory component cannot be performed and/or will not sufficiently correct the error condition. In some embodiments, the physical output component controller ignores the response in accordance with a determination that the error condition is and/or has become urgent (e.g., for which immediate action is appropriate). In some embodiments, an urgent error condition is a particular type of error condition (e.g., that is automatically considered urgent in response to being detected), an error condition that corresponds to a reaction time below a threshold time (e.g., there is a small time window to cause evasive and/or responsive movement to avoid and/or prevent the error condition or an associated result from occurring), an error condition that will cause (and/or has a probability above a configured threshold of causing) a type of effect (e.g., unacceptable effects) (e.g., type of collision, injury, and/or contact), and/or an error condition that is (and/or becomes) associated with one or more characteristics that configured to represent an urgent error condition.

In some embodiments, the set of one or more criteria includes a criterion that: is satisfied in accordance with a determination that the error condition (e.g., representing a detected and/or determined amount of risk of collision and/or bodily contact due to the movement of the movement component (e.g., 350, 350A, 350B, 606A, and/or 606B) (e.g., along the first movement trajectory (e.g., 510))) is not urgent (e.g., yes at 716) (e.g., risk of collision and/or bodily contact is detected to be below a threshold likelihood, risk of injury due to bodily contact is detected to be below a threshold likelihood, and/or a type of collision and/or bodily contact is unlikely to injure). In some embodiments, the set of one or more criteria includes a criterion that: is not satisfied in accordance with a determination that the error condition is urgent (e.g., no at 716) (e.g., risk of collision and/or bodily contact is detected to be above a threshold likelihood, risk of injury due to bodily contact is detected to be above a threshold likelihood, and/or a type of collision and/or bodily contact is likely to injure).

In some embodiments, causing movement of the movement component (e.g., 350, 350A, 350B, 606A, and/or 606B) includes causing movement of the movement component along the first movement trajectory (e.g., 510) (and/or a different movement trajectory, such as a modified first movement trajectory that is based on the first movement trajectory). In some embodiments, while causing movement of the movement component, the physical output component controller tracks progress of the movement component with respect to the first movement trajectory (e.g., comparing actual position to intended position at a particular time according to the first movement trajectory for the movement component), wherein detecting the error condition includes detecting that the progress of the movement component does not match (e.g., satisfy and/or follow) (e.g., within a threshold tolerance) the first movement trajectory (e.g., 510). In some embodiments, the tracking is performed while movement according to the first movement trajectory is occurring. In some embodiments, the tracking is performed over time (e.g., at regular intervals, irregular intervals, and/or on demand (e.g., in response to an ad hoc request)).

In some embodiments, the physical output component controller receives, from the coordinated trajectory planning component (e.g., 320 and/or 430) (e.g., via one or more other components, such as a system controller), a fourth movement trajectory (e.g., 510) (e.g., the first movement trajectory, the second movement trajectory, and/or a different movement trajectory).

In some embodiments, the fourth movement trajectory (e.g., 510) is received in conjunction with detecting the error condition (e.g., after and/or while) (e.g., included in, and/or in response to a communication received from, the coordinated trajectory planning component (e.g., 320 and/or 430)) and before causing movement of the movement component (e.g., 350, 350A, 350B, 606A, and/or 606B) along the third movement trajectory (e.g., 510). In some embodiments, the movement of the movement component along the third movement trajectory (e.g., 510) is caused without regard to (e.g., not using, ignoring, and/or not affect by and/or based on) the fourth movement trajectory (e.g., 510) (e.g., the fourth movement trajectory from the coordinated trajectory planning component is not used, and instead the third movement trajectory that is not received from the coordinated trajectory planning component is used) (e.g., due to a response not being a timely response, due to the error condition being urgent, and/or due that to the fourth movement trajectory is not able to be performed (e.g., the movement component cannot satisfy one or more characteristics of the fourth movement trajectory and/or the fourth movement trajectory is not valid (e.g., decodable, and/or compatible))).

In some embodiments, the physical output component controller outputs (e.g., by the physical output controller and/or the electronic device (e.g., 100 and/or 200)) (e.g., via one or more output devices (e.g., display generation components (e.g., touch-sensitive displays and/or display screens), audio output components (e.g., speakers and/or audio amplifiers), and/or haptic output components (e.g., vibration motors and/or a component that generates haptic output))) (e.g., in conjunction with detecting the error condition) an indication (e.g., a visual indication (e.g., a light output and/or a user interface object), an audio indication (e.g., a tone and/or a chime), and/or a haptic indication (e.g., a vibration and/or movement)) of the error condition (e.g., to another component and/or as perceptible output).

In some embodiments, in conjunction with detecting the error condition, the physical output component controller performs a substitute movement (e.g., an alternative movement and/or a fallback movement) (e.g., a movement that will not (and/or is not expected to) cause an error condition) according to a respective movement trajectory (e.g., 510) to negate the error condition (e.g., to prevent the error condition from occurring, to cause the error condition to be resolved and/or no longer be detected, and/or to accomplish a movement goal (e.g., reaching the endpoint of the first movement trajectory by another route and/or using different characteristics of movement) in a manner that mitigates the existence of the error condition (e.g., and/or an underlying cause of the error condition)), wherein: in accordance with a determination that communication between the body controller component and a coordinated trajectory planning component (e.g., 320 and/or 430) satisfies the set of one or more criteria, the respective movement trajectory is the second movement trajectory (e.g., the substitute movement is received from the coordinated trajectory planning component; and in accordance with a determination that communication between the body controller component and a coordinated trajectory planning component does not satisfy the set of one or more criteria, the respective movement trajectory is the third movement trajectory (e.g., the substitute movement is not received from the coordinated trajectory planning component).

In some embodiments, the respective movement trajectory (e.g., 510) (e.g., defining and/or representing the substitute movement) is a predetermined movement trajectory (e.g., 510) (e.g., is a movement trajectory that is performed in response to certain error conditions (e.g., a set of one or more error conditions including the error condition that is detected), in response to all error conditions, and/or in response to error conditions of a certain type) (e.g., received before detecting the error condition).

In some embodiments, the movement component (e.g., 350, 350A, 350B, 606A, and/or 606B) corresponds to respective state data (e.g., state of the movement component (e.g., actual physical location, position, pose, motion, velocity, acceleration, an obstruction, and/or power consumption) and/or of the environment of the movement component (e.g., a subject and/or object in the trajectory that will be an obstruction and/or cause a collision, weather, time of day, and/or surroundings)) while the error condition is detected. In some embodiments, in accordance with a determination that the respective state data is first state data, the respective movement trajectory (e.g., 510) (e.g., representing and/or defining the substitute movement) includes a first set of movement characteristics (e.g., path and/or timing for completing the respective movement trajectory). In some embodiments, in accordance with a determination that the respective state data is second state data different from the first state data, the respective movement trajectory (e.g., 510) (e.g., representing and/or defining the substitute movement) includes a second set of movement characteristics (e.g., path and/or timing for completing the respective movement trajectory) different from the first set of movement characteristics (e.g., the movement characteristics of the substitute movement depend on state data corresponding to the error condition and/or the movement component (e.g., environmental state, user state, and/or context data regarding the movement component and/or the error condition)).

In some embodiments, the substitute movement is a reversal (e.g., performing and/or replaying the same movement backwards) of movement of the movement component (e.g., 350, 350A, 350B, 606A, and/or 606B) according to a corresponding movement trajectory (e.g., 510) (e.g., the movement trajectory being used when the error condition is detected and/or immediately before the error condition is detected) (e.g., a movement trajectory according to which the movement (that is being reversed) was performed).

In some embodiments, the reversal is a partial reversal according to the corresponding movement trajectory (e.g., less than all of the corresponding movement trajectory is performed in reverse).

In some embodiments, the set of one or more inputs includes a user input (and/or a set of one or more user inputs and/or a set of one or more non-user inputs). In some embodiments, the set of one or more inputs includes user input (e.g., a tap input and/or a non-tap input (e.g., a verbal input, an audible request, an audible command, an audible statement, a swipe input, a hold-and-drag input, a gaze input, an air gesture, rotation of a steering mechanism, and/or a mouse click)) and/or non-user input (e.g., data input received from another component, electronic device (e.g., 100 and/or 200), and/or process that is not triggered by user input). In some embodiments, the set of one or more inputs includes data input (e.g., received data such as media, audio, video, policies, preferences, and/or environmental data), event data (e.g., an event generated by a processor, component, logic, and/or software of the electronic device), feedback data (e.g., a context, such as an environmental context, a subject context of a subject in an environment, and/or an operational context of a component), and/or sensor data (e.g., position, velocity, acceleration, force, visual, and/or audio) (e.g., of the electronic device, of a subject, and/or of a different electronic device (e.g., a wearable device, a companion device of the electronic device, an electronic device of the subject, and/or another type of electronic device)). In some embodiments, the set of one or more inputs includes (and/or is detected in conjunction with) an indication (e.g., a command, a request, an instruction, an event, a trigger, and/or a condition occurring) that a coordinated set of output trajectories should be executed, generated, and/or output.

In some embodiments, the set of one or more inputs includes additional data (e.g., non-user input data, data input, event data, feedback data, and/or sensor data) (e.g., weather, user proximity, and/or trip information).

Note that details of the processes described above with respect to method 800 (e.g., FIG. 8) are also applicable in an analogous manner to other techniques described herein.

The present disclosure has been laid out above referencing specific examples. However, such examples and descriptions are not intended limit the disclosure to those embodiments contained herein and are not intended to be exhaustive. Many modifications and variations are possible in view of the above teachings. The examples were chosen and described in order to best explain the principles of the techniques and their practical applications. An individual skilled in the art would thereby be enabled to utilize the present disclosure as laid out, and enabled to best utilize the techniques and various examples with various modifications as are suited to the particular use contemplated.

While the present disclosure and examples are accompanied by references to specific drawings, it is to be noted that various changes and modifications will become apparent to those skilled in the art. Such changes and modifications are to be understood as being included within the scope of the disclosure and examples as defined by the claims.

As described above, the present technology improves how a device interacts with a user by gathering and using data from various available sources. In some embodiments, this data can include personal data (e.g., demographic data, location-based data, telephone numbers, email addresses, home addresses, or any other identifying information) that uniquely identifies or can be used to contact or locate a specific person.

The present disclosure recognizes that the use of personal information data can enhance a user's experience while using a computer system. For example, personal information data can be used for the benefit of users by changing how a computer system interacts with a user. Thus, enabling better user interactions. Additionally, other uses for personal information data that benefit the user are also contemplated by the present disclosure.

The present disclosure further contemplates that the use of a user's personal information data, in the present technology, impacts the user's privacy. As well, that the entities responsible for the collection, analysis, disclosure, transfer, storage, or other use of such personal information data will comply with well-established privacy policies and/or privacy practices. Particularly, the implementation and maintenance of industry or government standard privacy policies and practice is required for entities to keep personal information data private and secure. For example, entities should only collect personal information data for reasonable and legitimate uses within the entity and should not be shared or sold to outside entities. Additionally, the collection of personal information data should only occur after receiving information consent from the target users. Further, once such personal information data has been obtained, entities should take necessary steps to secure the collected personal information data from improper access or use. Therefore, entities should ensure their practices follow their established privacy policies and procedures, either internally or through third party evaluations to certify their practices.

Alternatively, the present disclosure also ensures that the functionality of the disclosed embodiments is not rendered inoperable due to the lack of all or a portion of such personal information data. The present disclosure considers embodiments that allow users to selectively block the use of, or access to, personal information data. Such inability to access personal information data can be provided through hardware components and/or software elements. For example, in the case of image capture, the present technology can be configured to allow users to select to "opt in" or "opt out" of participation in the collection of personal information data during registration for services. Thus, while the present disclosure is broadly directed to the use of personal information data in one or more various disclosed embodiments, the present disclosure also contemplates that the various embodiments can also be implemented without the use of such personal information data. For example, content can be displayed to users by inferring location based on non-personal information data or a bare minimum amount of personal information, such as the content being requested by the device associated with a user or other non-personal information.

What is claimed is:

1. A method, comprising:
- at a physical output component controller of an electronic device:
  - detecting a set of one or more inputs corresponding to a request to move a movement component along a first movement trajectory;
  - in response to detecting the set of one or more inputs, causing movement of the movement component;
  - while causing movement of the movement component, detecting an error condition; and
  - in conjunction with detecting the error condition:
    - in accordance with a determination that communication between the physical output component controller and a coordinated trajectory planning component satisfies a set of one or more criteria, causing movement of the movement component along a second movement trajectory received from the coordinated trajectory planning component; and
    - in accordance with a determination that communication between the physical output component controller and the coordinated trajectory planning component does not satisfy the set of one or more criteria, causing movement of the movement component along a third movement trajectory that is not received from the coordinated trajectory planning component, wherein the third movement trajectory is different from the second movement trajectory.

2. The method of claim 1, wherein the set of one or more criteria includes a criterion that:

is satisfied in accordance with a determination that the physical output component controller receives a timely response from the coordinated trajectory planning component; and is not satisfied in accordance with a determination that the physical output component controller does not receive the timely response from the coordinated trajectory planning component.

3. The method of claim 2, wherein, in accordance with a determination that a response is not received during a predetermined period of time, the physical output component controller does not receive the timely response from the coordinated trajectory planning component.

4. The method of claim 2, further comprising:

receiving, from the coordinated trajectory planning component, a response corresponding to the error condition; and in response to receiving the response from the coordinated trajectory planning component, ignoring the response.

5. The method of claim 1, wherein the set of one or more criteria includes a criterion that:

is satisfied in accordance with a determination that the error condition is not urgent; and is not satisfied in accordance with a determination that the error condition is urgent.

6. The method of claim 1, wherein causing movement of the movement component includes causing movement of the movement component along the first movement trajectory, the method further comprising:

while causing movement of the movement component, tracking progress of the movement component with respect to the first movement trajectory, wherein detecting the error condition includes detecting that the progress of the movement component does not match the first movement trajectory.

7. The method of claim 1, further comprising:

receiving, from the coordinated trajectory planning component, a fourth movement trajectory.

8. The method of claim 7, wherein:

the fourth movement trajectory is received in conjunction with detecting the error condition and before causing movement of the movement component along the third movement trajectory; and the movement of the movement component along the third movement trajectory is caused without regard to the fourth movement trajectory.

9. The method of claim 1, further comprising:

outputting an indication of the error condition.

10. The method of claim 1, further comprising:

in conjunction with detecting the error condition, performing a substitute movement according to a respective movement trajectory to negate the error condition, wherein:

in accordance with the determination that communication between the physical output component controller and the coordinated trajectory planning component satisfies the set of one or more criteria, the respective movement trajectory is the second movement trajectory; and in accordance with the determination that communication between the physical output component controller and the coordinated trajectory planning component does not satisfy the set of one or more criteria, the respective movement trajectory is the third movement trajectory.

11. The method of claim 10, wherein the respective movement trajectory is a predetermined movement trajectory.

12. The method of claim 10, wherein:

the movement component corresponds to respective state data while the error condition is detected;

in accordance with a determination that the respective state data is first state data, the respective movement trajectory includes a first set of movement characteristics; and in accordance with a determination that the respective state data is second state data different from the first state data, the respective movement trajectory includes a second set of movement characteristics different from the first set of movement characteristics.

13. The method of claim 10, wherein the substitute movement is a reversal of movement of the movement component according to a corresponding movement trajectory.

14. The method of claim 13, wherein the reversal is a partial reversal according to the corresponding movement trajectory.

15. The method of claim 1, wherein the set of one or more inputs includes a user input.

16. The method of claim 1, wherein the set of one or more inputs includes additional data.

17. A non-transitory computer-readable storage medium storing one or more programs configured to be executed by one or more processors of an electronic device, the one or more programs including instructions for, by a physical output component controller:

detecting a set of one or more inputs corresponding to a request to move a movement component along a first movement trajectory;

in response to detecting the set of one or more inputs, causing movement of the movement component;

while causing movement of the movement component, detecting an error condition; and in conjunction with detecting the error condition:

in accordance with a determination that communication between the physical output component controller and a coordinated trajectory planning component satisfies a set of one or more criteria, causing movement of the movement component along a second movement trajectory received from the coordinated trajectory planning component; and in accordance with a determination that communication between the physical output component controller and the coordinated trajectory planning component does not satisfy the set of one or more criteria, causing movement of the movement component along a third movement trajectory that is not received from the coordinated trajectory planning component, wherein the third movement trajectory is different from the second movement trajectory.

18. The non-transitory computer-readable storage medium of claim 17, wherein the set of one or more criteria includes a criterion that:

is satisfied in accordance with a determination that the physical output component controller receives a timely response from the coordinated trajectory planning component; and is not satisfied in accordance with a determination that the physical output component controller does not receive the timely response from the coordinated trajectory planning component.

19. The non-transitory computer-readable storage medium of claim 18, wherein, in accordance with a determination that a response is not received during a predetermined period of time, the physical output component controller does not receive the timely response from the coordinated trajectory planning component.

20. The non-transitory computer-readable storage medium of claim 18, the one or more programs including instructions for:

receiving, from the coordinated trajectory planning component, a response corresponding to the error condition; and in response to receiving the response from the coordinated trajectory planning component, ignoring the response.

21. The non-transitory computer-readable storage medium of claim 17, wherein the set of one or more criteria includes a criterion that:

is satisfied in accordance with a determination that the error condition is not urgent; and is not satisfied in accordance with a determination that the error condition is urgent.

22. The non-transitory computer-readable storage medium of claim 17, wherein causing movement of the movement component includes causing movement of the movement component along the first movement trajectory, the one or more programs including instructions for:

while causing movement of the movement component, tracking progress of the movement component with respect to the first movement trajectory, wherein detecting the error condition includes detecting that the progress of the movement component does not match the first movement trajectory.

23. The non-transitory computer-readable storage medium of claim 17, the one or more programs including instructions for:

receiving, from the coordinated trajectory planning component, a fourth movement trajectory.

24. The non-transitory computer-readable storage medium of claim 23, wherein:

the fourth movement trajectory is received in conjunction with detecting the error condition and before causing movement of the movement component along the third movement trajectory; and the movement of the movement component along the third movement trajectory is caused without regard to the fourth movement trajectory.

25. The non-transitory computer-readable storage medium of claim 17, the one or more programs including instructions for:

outputting an indication of the error condition.

26. The non-transitory computer-readable storage medium of claim 17, the one or more programs including instructions for:

in conjunction with detecting the error condition, performing a substitute movement according to a respective movement trajectory to negate the error condition, wherein:

in accordance with the determination that communication between the physical output component controller and the coordinated trajectory planning component satisfies the set of one or more criteria, the respective movement trajectory is the second movement trajectory; and in accordance with the determination that communication between the physical output-component controller and the coordinated trajectory planning component does not satisfy the set of one or more criteria, the respective movement trajectory is the third movement trajectory.

27. The non-transitory computer-readable storage medium of claim 26, wherein the respective movement trajectory is a predetermined movement trajectory.

28. The non-transitory computer-readable storage medium of claim 26, wherein:

the movement component corresponds to respective state data while the error condition is detected;

in accordance with a determination that the respective state data is first state data, the respective movement trajectory includes a first set of movement characteristics; and in accordance with a determination that the respective state data is second state data different from the first state data, the respective movement trajectory includes a second set of movement characteristics different from the first set of movement characteristics.

29. The non-transitory computer-readable storage medium of claim 26, wherein the substitute movement is a reversal of movement of the movement component according to a corresponding movement trajectory.

30. The non-transitory computer-readable storage medium of claim 29, wherein the reversal is a partial reversal according to the corresponding movement trajectory.

31. The non-transitory computer-readable storage medium of claim 17, wherein the set of one or more inputs includes a user input.

32. The non-transitory computer-readable storage medium of claim 17, wherein the set of one or more inputs includes additional data.

33. An electronic device, comprising:

one or more processors; and memory storing one or more programs configured to be executed by the one or more processors, the one or more programs including instructions for, by a physical output component controller:

detecting a set of one or more inputs corresponding to a request to move a movement component along a first movement trajectory;

in response to detecting the set of one or more inputs, causing movement of the movement component;

while causing movement of the movement component, detecting an error condition; and in conjunction with detecting the error condition:

in accordance with a determination that communication between the physical output component controller and a coordinated trajectory planning component satisfies a set of one or more criteria, causing movement of the movement component along a second movement trajectory received from the coordinated trajectory planning component; and in accordance with a determination that communication between the physical output component controller and the coordinated trajectory planning component does not satisfy the set of one or more criteria, causing movement of the movement component along a third movement trajectory that is not received from the coordinated trajectory planning component, wherein the third movement trajectory is different from the second movement trajectory.

34. The electronic device of claim 33, wherein the set of one or more criteria includes a criterion that:

is satisfied in accordance with a determination that the physical output component controller receives a timely response from the coordinated trajectory planning component; and is not satisfied in accordance with a determination that the physical output component controller does not receive the timely response from the coordinated trajectory planning component.

35. The electronic device of claim 34, wherein, in accordance with a determination that a response is not received during a predetermined period of time, the physical output component controller does not receive the timely response from the coordinated trajectory planning component.

36. The electronic device of claim 34, the one or more programs including instructions for:

receiving, from the coordinated trajectory planning component, a response corresponding to the error condition; and in response to receiving the response from the coordinated trajectory planning component, ignoring the response.

37. The electronic device of claim 33, wherein the set of one or more criteria includes a criterion that:

is satisfied in accordance with a determination that the error condition is not urgent; and is not satisfied in accordance with a determination that the error condition is urgent.

38. The electronic device of claim 33, wherein causing movement of the movement component includes causing movement of the movement component along the first movement trajectory, the one or more programs including instructions for:

while causing movement of the movement component, tracking progress of the movement component with respect to the first movement trajectory, wherein detecting the error condition includes detecting that the progress of the movement component does not match the first movement trajectory.

39. The electronic device of claim 33, the one or more programs including instructions for:

receiving, from the coordinated trajectory planning component, a fourth movement trajectory.

40. The electronic device of claim 39, wherein:

the fourth movement trajectory is received in conjunction with detecting the error condition and before causing movement of the movement component along the third movement trajectory; and the movement of the movement component along the third movement trajectory is caused without regard to the fourth movement trajectory.

41. The electronic device of claim 33, the one or more programs including instructions for:

outputting an indication of the error condition.

42. The electronic device of claim 33, the one or more programs including instructions for:

in conjunction with detecting the error condition, performing a substitute movement according to a respective movement trajectory to negate the error condition, wherein:

in accordance with the determination that communication between the physical output component controller and the coordinated trajectory planning component satisfies the set of one or more criteria, the respective movement trajectory is the second movement trajectory; and in accordance with the determination that communication between the physical output-component controller and the coordinated trajectory planning component does not satisfy the set of one or more criteria, the respective movement trajectory is the third movement trajectory.

43. The electronic device of claim 42, wherein the respective movement trajectory is a predetermined movement trajectory.

44. The electronic device of claim 42, wherein:

the movement component corresponds to respective state data while the error condition is detected;

in accordance with a determination that the respective state data is first state data, the respective movement trajectory includes a first set of movement characteristics; and in accordance with a determination that the respective state data is second state data different from the first state data, the respective movement trajectory includes a second set of movement characteristics different from the first set of movement characteristics.

45. The electronic device of claim 42, wherein the substitute movement is a reversal of movement of the movement component according to a corresponding movement trajectory.

46. The electronic device of claim 45, wherein the reversal is a partial reversal according to the corresponding movement trajectory.

47. The electronic device of claim 33, wherein the set of one or more inputs includes a user input.

48. The electronic device of claim 33, wherein the set of one or more inputs includes additional data.

* * * * *